(12) United States Patent
Lynch

(10) Patent No.: US 11,040,754 B2
(45) Date of Patent: Jun. 22, 2021

(54) DAMPERS FOR BICYCLE SUSPENSION COMPONENTS

(71) Applicant: SRAM, LLC, Chicago, IL (US)

(72) Inventor: Timothy Lynch, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/251,734

(22) Filed: Jan. 18, 2019

(65) Prior Publication Data

US 2020/0231245 A1 Jul. 23, 2020

(51) Int. Cl.
| | |
|---|---|
| *B62K 25/04* | (2006.01) |
| *F16F 9/34* | (2006.01) |
| *F16F 9/32* | (2006.01) |
| *F16F 13/00* | (2006.01) |
| *F16F 9/06* | (2006.01) |
| *F16F 9/46* | (2006.01) |
| *F16F 9/096* | (2006.01) |

(52) U.S. Cl.
CPC .............. *B62K 25/04* (2013.01); *F16F 9/063* (2013.01); *F16F 9/3257* (2013.01); *F16F 9/34* (2013.01); *F16F 13/007* (2013.01); *B62K 2025/048* (2013.01); *F16F 9/065* (2013.01); *F16F 9/096* (2013.01); *F16F 9/466* (2013.01); *F16F 9/469* (2013.01); *F16F 2222/126* (2013.01); *F16F 2230/42* (2013.01); *F16F 2232/08* (2013.01); *F16F 2238/04* (2013.01)

(58) Field of Classification Search
CPC .. F16F 9/063; F16F 9/065; F16F 9/081; F16F 9/088; F16F 9/096; F16F 9/34; F16F 9/342; F16F 9/44; F16F 9/46; F16F 9/464; F16F 9/465; F16F 9/466; F16F 9/469; B62K 25/04; B62K 2025/047; B62K 2025/048
USPC ............................................... 188/298, 319.1
See application file for complete search history.

(56) References Cited

U.S. PATENT DOCUMENTS

| | | | | |
|---|---|---|---|---|
| 4,305,486 | A | * 12/1981 | Cowan ...................... | F16F 9/44 188/282.1 |
| 5,139,119 | A | * 8/1992 | Karnopp .................. | F16F 9/466 188/282.2 |
| 5,248,159 | A | 9/1993 | Moore | |
| 5,332,068 | A | 7/1994 | Richardson et al. | |
| 5,409,249 | A | 4/1995 | Busby | |
| 5,566,796 | A | * 10/1996 | De Kock ................ | F16F 9/467 188/282.1 |
| 5,598,903 | A | 2/1997 | Richardson | |
| 5,820,114 | A | 10/1998 | Tsai | |

(Continued)

*Primary Examiner* — Thomas J Williams

(57) ABSTRACT

Example dampers for bicycle suspension components are described herein. An example damper includes a damper body defining a chamber, a shaft extending into the chamber of the damper body, and an adjustable piston system having a piston body coupled to the shaft. The adjustable piston system controls a flow of fluid between the first and second chambers. The adjustable piston system includes an adjustable rebound orifice forming part of a rebound flow path to control the flow of fluid from the first chamber to the second chamber across the piston body, an adjustable compression orifice forming part of a low flow compression flow path to control the flow of fluid from the second chamber to the first chamber across the piston body, an isolation member to separate the rebound flow path and the low flow compression flow path.

17 Claims, 12 Drawing Sheets

(56) References Cited

U.S. PATENT DOCUMENTS

| | | |
|---|---|---|
| 5,924,714 A | 7/1999 | Farris et al. |
| 6,026,939 A | 2/2000 | Girvin et al. |
| 6,095,541 A | 8/2000 | Turner et al. |
| 6,099,010 A | 8/2000 | Busby |
| 6,105,987 A | 8/2000 | Turner |
| 6,119,830 A | 9/2000 | Richardson et al. |
| 6,164,424 A | 12/2000 | Girvin et al. |
| 6,244,609 B1 | 6/2001 | Wilson |
| 6,318,523 B1 | 11/2001 | Moradmand et al. |
| 6,371,262 B1 * | 4/2002 | Katou ............... F16F 9/465 |
| | | 188/266.5 |
| 6,378,885 B1 | 4/2002 | Ellsworth et al. |
| 6,450,521 B1 | 9/2002 | Turner |
| 6,460,664 B1 | 10/2002 | Steed et al. |
| 6,505,719 B2 | 1/2003 | Gonzalez et al. |
| 6,866,281 B2 | 3/2005 | Chamberlain et al. |
| 7,673,936 B2 | 3/2010 | Hsu |
| 8,950,559 B2 * | 2/2015 | de Kock ............ F16F 9/3488 |
| | | 188/282.8 |
| 9,273,746 B2 * | 3/2016 | Chen ................. F16F 9/466 |
| 2003/0038450 A1 | 2/2003 | Lam |
| 2004/0222056 A1 | 11/2004 | Fox |
| 2006/0065496 A1 | 3/2006 | Fox |
| 2007/0034464 A1 | 2/2007 | Barefoot |
| 2010/0059965 A1 | 3/2010 | Earle |
| 2012/0235332 A1 * | 9/2012 | Jordan ............... F16F 9/461 |
| | | 267/64.26 |
| 2015/0183487 A1 | 7/2015 | Tsai |
| 2016/0377141 A1 | 12/2016 | Anderson |

\* cited by examiner

DAMPERS FOR BICYCLE SUSPENSION COMPONENTS

FIELD OF THE DISCLOSURE

This disclosure relates generally to bicycle components and, more specifically, to dampers for bicycle suspension components.

BACKGROUND

Bicycles often include suspension components to absorb vibrations and impacts as the bicycle travels over rough terrain. A common suspension component is a shock absorber, which incorporates a damper and a spring that act in conjunction to absorb shock impulses. Known dampers include a piston body that moves in a cylinder of fluid.

SUMMARY

An example damper for a bicycle suspension component is disclosed herein. The damper includes a damper body defining a chamber, a shaft extending into the chamber of the damper body, and an adjustable piston system having a piston body coupled to the shaft. The piston body is slidably received within the damper body. The piston body divides the chamber into a first chamber and a second chamber. The adjustable piston system is to control a flow of fluid between the first and second chambers. The adjustable piston system includes an adjustable rebound orifice forming part of a rebound flow path to control the flow of fluid from the first chamber to the second chamber across the piston body, an adjustable compression orifice forming part of a low flow compression flow path to control the flow of fluid from the second chamber to the first chamber across the piston body, and an isolation member disposed between the adjustable rebound orifice and the adjustable compression orifice to separate the rebound flow path and the low flow compression flow path.

Another example damper for a bicycle suspension component is disclosed herein that includes a damper body defining a chamber, a shaft extending into the chamber of the damper body, and an adjustable piston system having a piston body coupled to the shaft. The piston body is slidably received within the damper body. The piston body divides the chamber into a first chamber and a second chamber. The adjustable piston system defines a flow path between the first chamber and the second chamber across the piston body. The adjustable piston system includes a compression needle tip extending through the piston body, the compression needle tip moveable relative to the piston body, and a check valve coupled to the compression needle tip and moveable with the compression needle tip relative to the piston body. The check valve is to enable a flow of fluid through the flow path from the first chamber to the second chamber and prevent the flow of fluid through the flow path from the second chamber to the first chamber.

Another example damper for a bicycle suspension component disclosed herein includes a damper body defining a chamber, a shaft extending into the chamber of the damper body, and an adjustable piston system having a piston body coupled to the shaft. The piston body is slidably received within the damper body. The piston body divides the chamber into a first chamber and a second chamber. The adjustable piston system defines a flow path between the first chamber and the second chamber across the piston body. The adjustable piston system includes a rebound needle coaxially disposed in the shaft, a compression needle coaxially disposed in the rebound needle, and a compression needle tip coupled to an end of the compression needle and extending through the piston body. The compression needle tip has an internal passage that forms a portion of the flow path between the first chamber and the second chamber.

Figure 1:
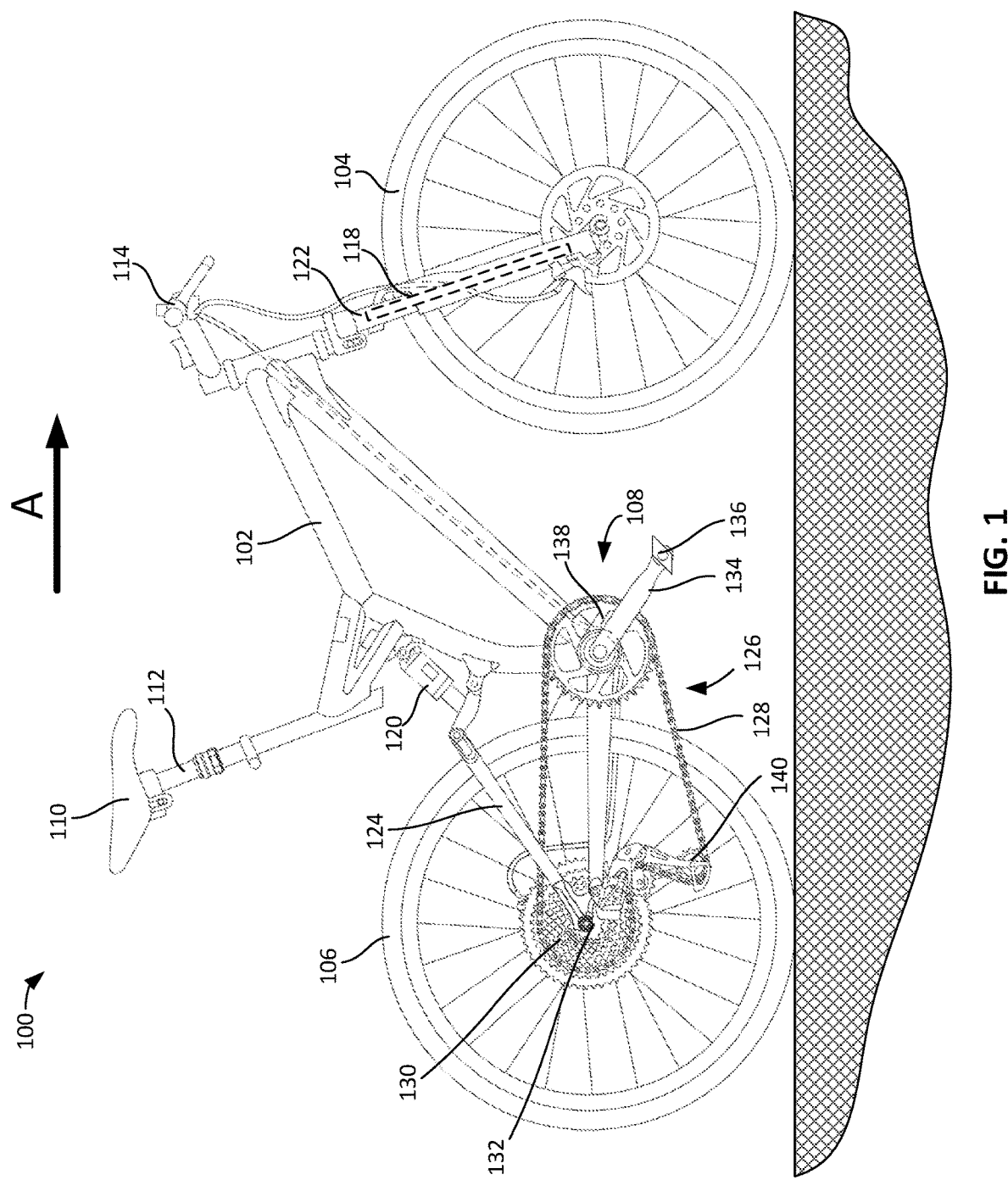
FIG. 1 is a side view of an example bicycle that may employ an example damper constructed in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example dampers that may be implemented as a suspension component of a vehicle, such as a bicycle. The example dampers may be utilized as part of a shock absorber. The example dampers include adjustable piston systems that enable independent control of low speed and high speed rebound and compression. In particular, the example adjustable piston systems disclosed herein include a unique flow path that separates the low speed compression flow path from the rebound flow paths, as disclosed in further detail herein.

Example adjustable piston systems (sometimes referred to as adjustable piston valves) include a piston body coupled to a shaft and slidably received within a chamber of a damper body. The chamber is filled with a fluid. The fluid is typically a hydraulic, damping, or suspension fluid, such as an oil. The piston body divides the chamber into a first chamber and a second chamber. As the damper is compressed or expanded (referred to as rebound), the piston body slides in one direction or the other in the chamber. The adjustable piston system is configured to control the flow of fluid across or through the piston body and between the first and second chambers, thereby damping (i.e., slowing) the movement of the shock absorber. The adjustable piston system defines first and second compression flow paths (sometimes referred to high and low flow compression flow paths) as well as first and second rebound flow paths across the piston body. These flow paths include check valves (e.g., shim valves) that provide resistance as the fluid flows through the respective flow paths. The example adjustable piston system also includes a rebound orifice and a compression office that can be adjusted to affect the flow rates through these flow paths and, thus, the amount damping provided during compression and rebound. As such, the example adjustable piston systems disclosed herein are configured to independently control the low speed compression and low speed rebound rates, as well as high speed compression and high speed rebound rates.

In known adjustable piston systems, a first one of rebound flow paths, which is followed when the rebound orifice is open, and the low flow compression flow path share a common path through a hollow piston bolt. However, when both the rebound orifice and the compression orifice are open, this arrangement allows the fluid to flow freely from one orifice to the other and, thus, from one chamber to the other chamber without flowing through the check valves. As a result, minimal (if any) damping occurs, thereby adversely affecting the ability of the damper to reduce or slow compression or rebound of the shock absorber and, thus, reducing the effectiveness of the shock absorber to absorb vibrations or shocks.

The example adjustable piston systems disclosed herein include an isolation member that isolates or separates the low flow compression flow path and the first rebound flow path. As a result, when the adjustable compression orifice and the adjustable rebound orifice are both open, the flow paths are isolated from each other, thereby preventing the direct flow of fluid from one orifice to the other orifice. In some examples, the isolation member is implemented as a seal that is disposed between the adjustable rebound orifice and the adjustable compression orifice. The seal prevents fluid from flowing between the two orifices when the orifices are simultaneously open. Further, in some examples disclosed herein, at least a portion of the first rebound flow path is formed by an internal passage of the compression needle tip. For example, during a rebound stroke when the rebound orifice is open, the fluid may flow from the first chamber through an inlet opening into the shaft. The fluid then flows through the adjustable rebound orifice, an internal passage of a hollow piston bolt, a first opening in the compression needle tip, and into the internal passage of the compression needle tip. The internal passageway fluidly couples the first opening and a second opening in the compression needle tip. The second opening is aligned with a rebound check valve coupled to the compression needle tip. The fluid flows out of the compression needle tip through the rebound check valve into the second chamber. The rebound check valve enables the fluid to flow through the first rebound flow path from the first chamber to the second chamber during rebound, but prevents the flow of fluid from the second chamber into the first rebound flow path during compression. In some examples, the rebound check valve is coupled to and moveable with the compression needle tip relative to the piston body.

These and other examples are described with reference to various figures. It is understood that the figures and descriptions set out herein are provided for illustration only and do not limit the invention to the disclosed examples. For example, the terms "first" and "second," "front" and "rear," or "left" and "right" are used in the detailed description for the sake of clarity and not as terms of limitation. Moreover, the terms refer to bicycle mechanisms conventionally mounted to a bicycle and with the bicycle oriented and used in a standard fashion unless otherwise indicated.

Turning now to the figures, FIG. 1 illustrates one example of a human powered vehicle on which the examples disclosed herein may be implemented. In this example, the vehicle is one possible type of bicycle 100, such as a mountain bicycle. In the illustrated example, the bicycle 100 includes a frame 102, a front wheel 104 and a rear wheel 106 rotatably coupled to the frame 102, and a drive train 108. A front and/or forward riding direction or orientation of the bicycle 100 is indicated by the direction of the arrow A in FIG. 1. As such, a forward direction of movement for the bicycle 100 is indicated by the direction of arrow A. The example bicycle 100 includes a seat 110 coupled to the frame 102 (e.g., near a rear end of the frame 102 relative to the forward direction A) via a seat post 112. The bicycle 100 also includes handlebars 114 coupled to the frame 102 (e.g., near a forward end of the frame 102 relative to the forward direction A).

In the illustrated example, the bicycle 100 includes a suspension system having one or more suspension components including a front suspension component 118 and a rear suspension component 120. The front and rear suspension components 118, 120 are shock absorbers (sometimes referred to as shocks). In this example, the front suspension component 118 is integrated into a fork 122 that couples the front wheel 104 and the frame 102. The rear suspension component 120 is coupled between two portions of the frame 102, including a swing arm 124 coupled to the rear wheel 106. The front and rear suspension components 118, 120 absorb shocks while riding the bicycle 100 (e.g., when riding over rougher terrain). In other examples, the front suspension component 118 and/or the rear suspension component 120 may be integrated into the bicycle 100 in other configurations or arrangements. Further, in other examples, the suspension system may employ only one suspension component (e.g., only one shock absorber, such as the front suspension component 118) or more than two suspension components (e.g., an additional suspension component on the seat post 112) in addition to or as an alternative to the front and/or rear suspension components 118, 120.

The bicycle 100 of FIG. 1 also includes a crank assembly 126. The crank assembly 126 is operatively coupled via a chain 128 to a sprocket assembly 130. The sprocket assembly 130 is part of an assembly that is mounted to a rear hub 132 providing a rotation axis of the rear wheel 106. The crank assembly 126 includes at least one, and typically two, crank arms 134 and pedals 136, along with at least one front sprocket, or chainring 138. A rear gear change device 140, such as a derailleur, is disposed at the rear wheel 106 to move the chain 128 through different sprockets of the sprocket assembly 130. In some examples, a front gear change device is provided to move the chain 128 through multiple sprockets of the crank assembly 126.

While the example bicycle 100 depicted in FIG. 1 is a type of mountain bicycle, the example dampers disclosed herein can be implemented on other types of bicycles. For example, the disclosed dampers may be used on road bicycles, as well as bicycles with mechanical (e.g., cable, hydraulic, pneumatic, etc.) and non-mechanical (e.g., wired, wireless) drive systems. The disclosed dampers may also be implemented on other types of two-, three-, and four-wheeled human powered vehicles. Further, the example dampers can be used on other types of vehicles, such as motorized vehicles (e.g., a motorcycle, a car, a truck, etc.). Also, while the example dampers and adjustable piston systems disclosed herein are described in connection with a rear suspension component, it is understood that any of the example disclosed herein can likewise be implemented in a front suspension component, such as in the front suspension component 118 in the fork 122. For example, in common forks, one leg or stanchion includes a spring and the other leg includes a damper. Any of the examples disclosed herein may be implemented in the damping leg, for example.

Figure 2:
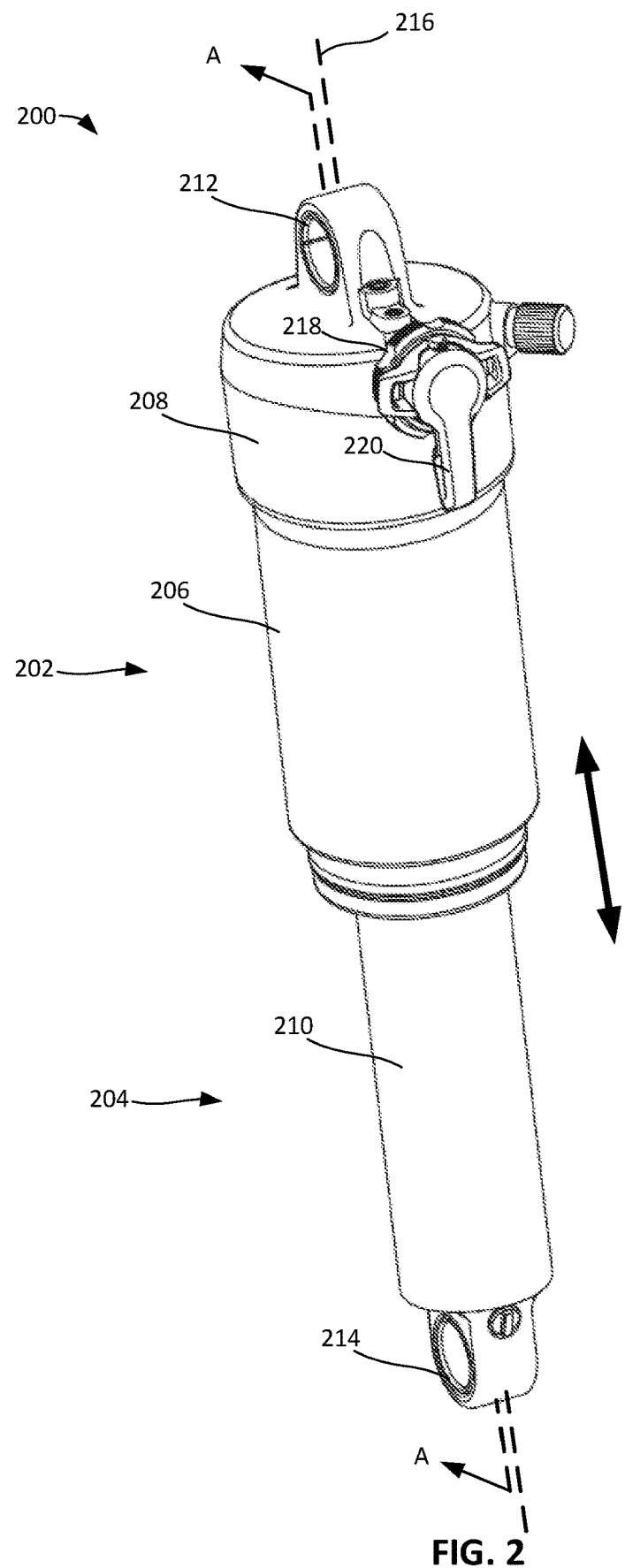
FIG. 2 illustrates an example shock absorber (a suspension component) incorporating an example damper constructed in accordance with the teachings of this disclosure.

FIG. 2 is a perspective view of an example shock absorber 200 (a suspension component) constructed in accordance with the teachings of this disclosure. The example shock absorber 200 can be implemented as the rear suspension component 120 and used on the bicycle 100 of FIG. 1. For example, the shock absorber 200 can be coupled between the frame 102 and the swing arm 124 to absorb vibrations and shocks from the rear wheel 106.

The example shock absorber 200 includes an integrated spring 202 and damper 204. The spring 202 operates (by compressing or expanding) to absorb vibrations or shocks, while the damper operates to dampen (slow) the movement of the spring. In the illustrated example, the spring is implemented as an air can 206. However, in other examples, other types of springs may be implemented, such as a coil spring. The shock absorber 200 includes a cap 208. The air can 206 is coupled to and extends from the cap 208. The damper 204 includes a damper body 210. The cap 208 (e.g., the top of the air can 206) and the damper body 210 include respective first and second attachment portions 212, 214 (e.g., eyelets) at distal ends for connecting between two components of a bicycle, such as the frame 102 and the swing arm 124 connected to the rear wheel 106 of the bicycle 100 (FIG. 1). In the illustrated example, the first and second attachment portions 212, 214 are aligned along a longitudinal axis 216 of the shock absorber 200. The air can 206 and the damper body 210 are configured in a telescopic arrangement. As such, the damper body 210 is moveable into and out of the air can 206. For example, during compression, the first and second attachment portions 212, 214 are pushed toward each other, which moves the damper body 210 into the air can 206. Conversely, during rebound, the first and second attachment portions 212, 214 are pushed (or and/or pulled) apart from each other, which moves the damper body 210 out of the air can 206.

In general, a low speed compression of the shock absorber 200 is followed by a low speed rebound, and a high speed compression of the shock absorber 200 is followed by a high speed rebound The example damper 204 of FIG. 2 includes the ability to independently adjust the compression and rebound rates. In particular, the high speed compression and rebound rates may be adjusted independently of each other, and the low speed compression and rebound rates may be adjusted independent of each other. This type of control enables the shock absorber 200 to be configured for specific types of riding and for specific rider styles and preferences.

In the illustrated example, the shock absorber 200 includes a rebound adjust dial 218 on the cap 208. The rebound adjust dial 218 may be adjusted (e.g., rotated clockwise or counter-clockwise) to increase or decrease the rebound rate. Further, the shock absorber 200 includes a compression adjust lever 220 on the cap 208 that can be adjusted (e.g., turned to the left or right) to increase or decrease the compression rate. In some examples, the compression adjust lever 220 is moveable to a lockout position to place the shock absorber 200 in a lockout mode, as disclosed in further detail in connection with FIG. 9. In some examples, the rebound adjust dial 218 and the compression adjust lever 220 are manually adjusted by a user (e.g., the rider). For example, a user may use his/her hand to adjust the rebound adjust dial 218 and the compression adjust lever 220. In other examples, one or more actuation mechanisms may be located on the handlebars 114 (FIG. 1) that a rider can actuate to adjust the rebound adjust dial 218 and/or the compression adjust lever 220.

Figure 3:
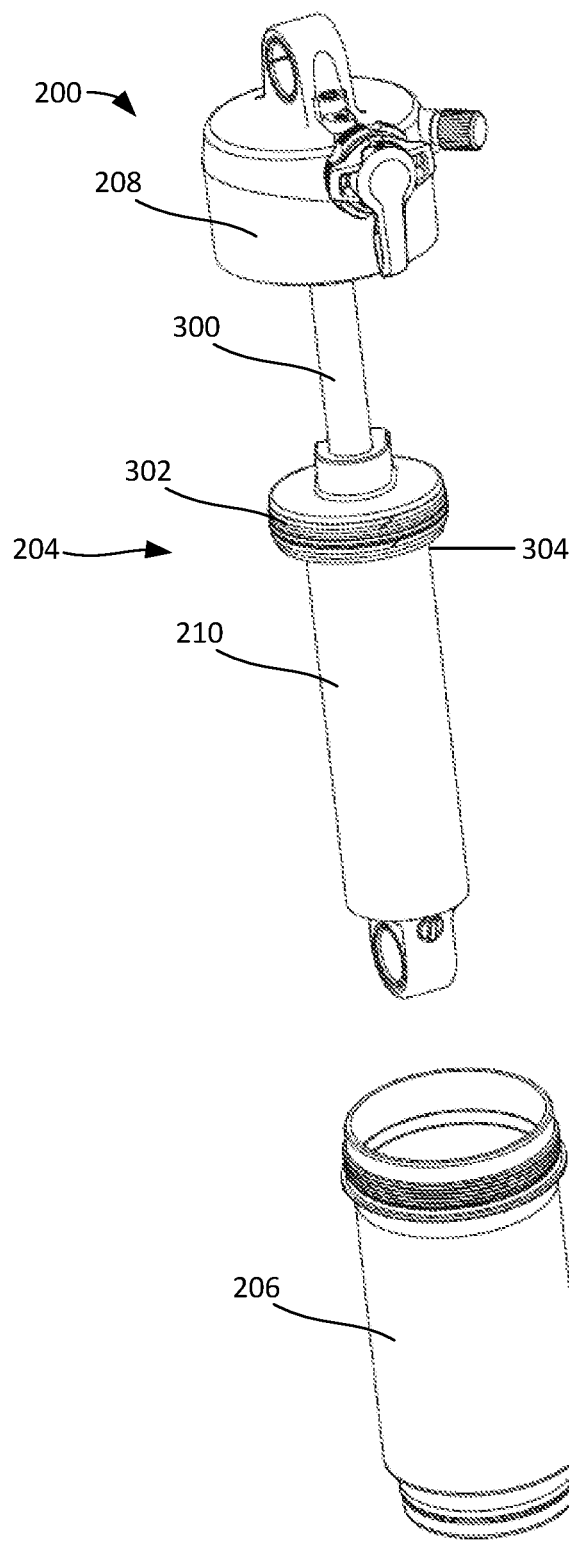
FIG. 3 is a partially exploded view of the example shock absorber with the example damper of FIG. 2.

FIG. 3 is a partially exploded view of the shock absorber 200. In the illustrated example, the damper 204 of the shock absorber 200 includes a shaft 300 that is coupled to and extends from the cap 208. A fixed piston 302 is coupled (e.g., via threaded engagement) to a top end 304 of the damper body 210. The shaft 300 extends through the fixed piston 302 and into a chamber of the damper body 210. The shaft 300 is slidable into and out of the damper body 210 through the fixed piston 302. When assembled, the fixed piston 302 is slidably received within the air can 206. During compression, the fixed piston 302 is pushed into the air can 206, which compresses a gas (e.g., air) within the air can 206. After the compressive force is removed, the compressed fluid in the air can 206 acts against the fixed piston 302 and pushes the fixed piston 302 (and, thus, the damper body 210) outward from the air can 206. In other examples the air can 206 can be filled with other types of fluids (e.g., oil). Further, in other examples, other types of springs can be used, such as coil spring.

Figure 4:
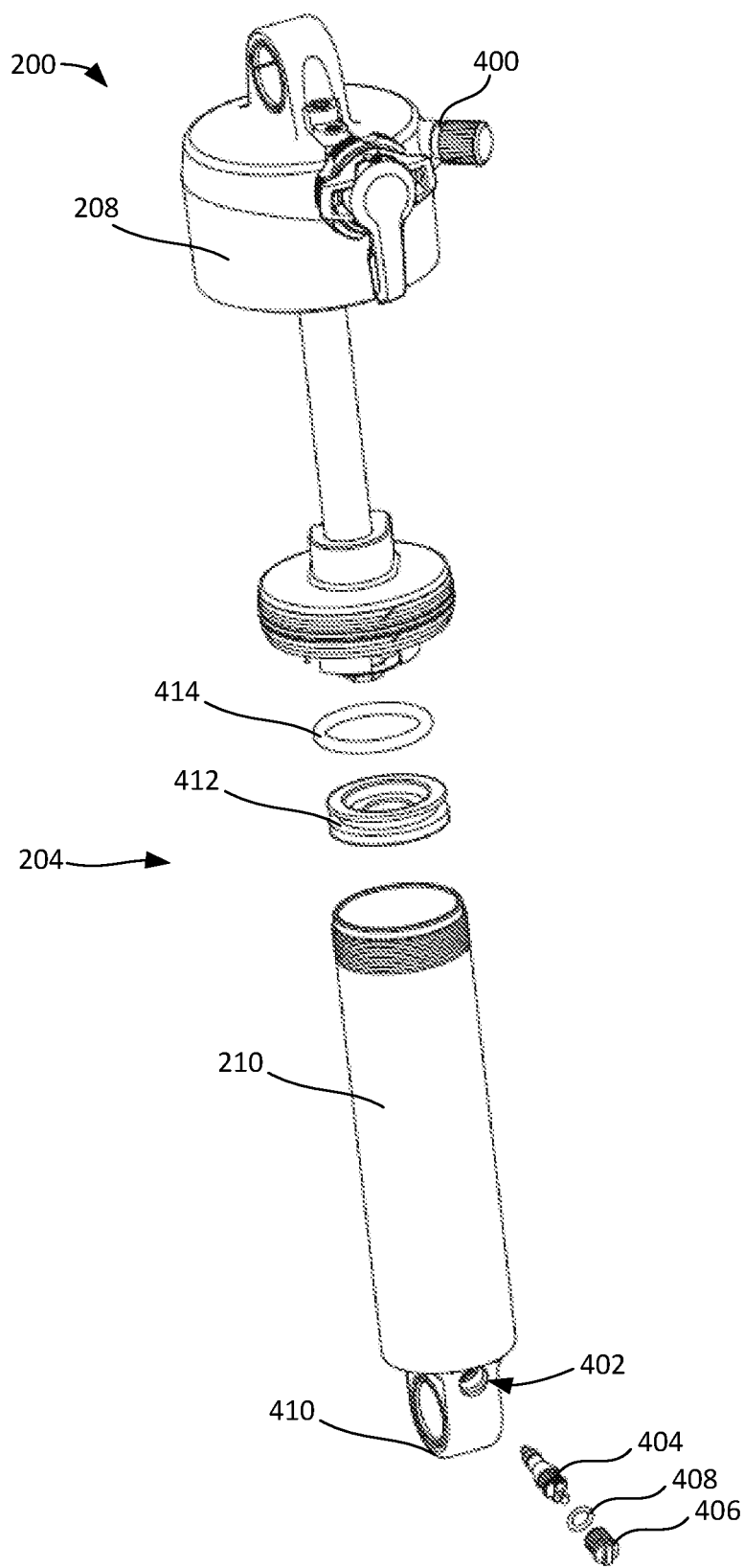
FIG. 4 is another partially exploded view of the example shock absorber with the example damper of FIG. 2.

FIG. 4 is another partially exploded view of the shock absorber 200 and the damper 204. The air can 206 is not shown in FIG. 4 for clarity. The shock absorber 200 includes a first fill port 400 (e.g., an air fill port). The first fill port 400 is used to add or remove fluid (e.g., air) from the air can 206 (FIGS. 2 and 3). In the illustrated example, the first fill port 400 is formed in the cap 208 of the shock absorber 200. In other examples, the first fill port 400 may be disposed in another location and/or the air can 206 may be filled and/or emptied in another manner.

In the illustrated example, the shock absorber 200 includes a second fill port 402. The second fill port 402 connects to a section of a chamber defined in the damper body 210, as disclosed in further detail herein. A high pressure valve core 404 is disposed in the second fill port 402, and a cap 406 may be used to cover the high pressure valve core 404. The high pressure valve core 404 is used to add or remove pneumatic fluid, such as air or nitrogen, from a pneumatic pressure chamber through the second fill port 402. In some examples, a seal 408 is disposed around the high pressure valve core 404 to prevent leaks. In the illustrated example, the second fill port 402 is disposed at or near a bottom end 410 of the damper body 210. In other examples, the second fill port 402 may be disposed in another location and/or the section of the chamber of the damper body 210 may be filled and/or emptied in another manner.

In some examples, the shock absorber 200 includes an internal floating piston (IFP) 412 that is slidably disposed within the damper body 210. The IFP 412 is used to separate fluid sections in the damper body 210, disclosed in further detail herein. A seal 414 (e.g., an o-ring) is disposed around the IFP 412 to prevent fluid from leaking between two sections of the chamber.

Figure 5:
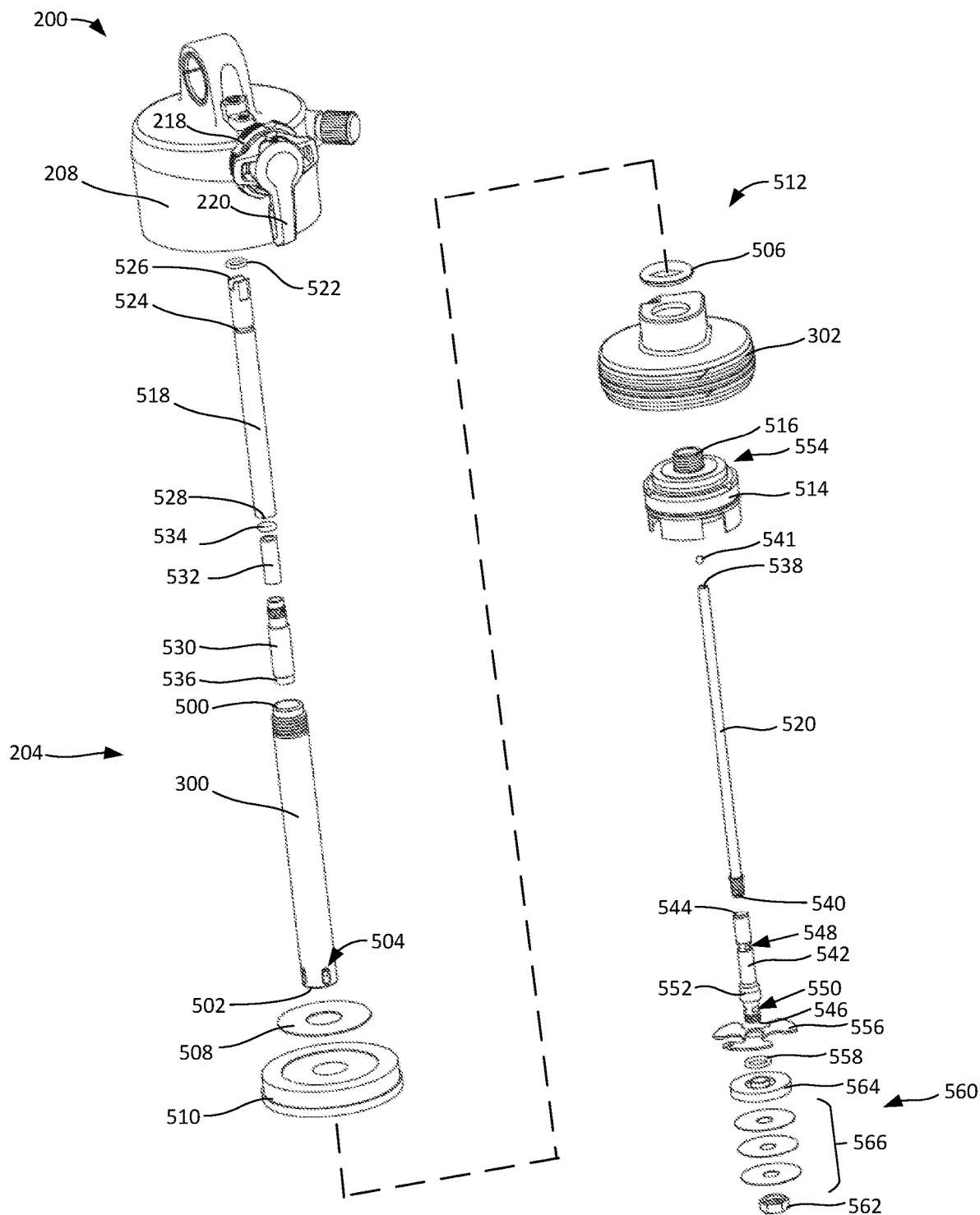
FIG. 5 is another partially exploded view of the example shock absorber with the example damper of FIG. 2.

FIG. 5 is another exploded view of the shock absorber 200 including the damper 204. In FIG. 5, the air can 206, the damper body 210, and the IFP 412 are not shown for clarity. In the illustrated example, the shock absorber 200 includes the shaft 300. The shaft 300 is hollow and has a first end 500 and a second end 502 opposite the first end 500. When the shock absorber 200 is assembled, the first end 500 of the shaft 300 is coupled (e.g., via threads) to the cap 208. In the illustrated example, the shaft 300 includes a plurality of inlet openings 504 (one of which is referenced in FIG. 5) near the second end 502. The inlet openings 504 allow fluid to flow into the shaft 300 during low speed rebound, as disclosed in further detail herein. While in this example the shaft 300 includes multiple inlet openings 504, in other examples, the shaft 300 may include only one inlet opening. As described above, when the shock absorber 200 is assembled, the fixed piston 302 is slidable along the shaft 300. A seal 506 (e.g., an o-ring) prevents fluid (e.g., air) from leaking between the fixed piston 302 and the shaft 300.

In the illustrated example, the shock absorber 200 includes a washer 508 and a travel reducer 510 that are to be disposed within the cap 208. When the shock absorber 200 is assembled, the washer 508 and the travel reducer 510 are disposed within the cap 208, and the shaft 300 extends through the washer 508 and the travel reducer 510. The travel reducer 510 can be used to set the stroke length of the shock absorber 200. Different thickness travel reducers can be employed to change the stroke length while maintaining the same sized spring 202 and damper 204.

In the illustrated example, the damper 204 includes one or more parts that form an adjustable piston system 512 (which may also be referred to as an adjustable piston valve) that controls the compression and rebound damping rates. In this example, the adjustable piston system 512 includes a piston body 514. In some examples, the piston body 514 is constructed of multiple parts or components, as disclosed in further detail herein. The piston body 514 is to be disposed within a chamber of the damper body 210 (shown in more detail in FIG. 6) and divides the chamber into first and second chambers. The adjustable piston system 512 controls the flow of fluid through or across the piston body 514 between the first and second chamber, thereby affecting the compression and rebound rates. The piston body 514 is coupled to the second end 502 of the shaft 300 via a hollow piston bolt 516.

To independently adjust the compression and rebound rates of the damper 204, the adjustable piston system 512 includes a rebound needle 518 (sometimes referred to a rebound rod) and a compression needle 520 (sometimes referred to as a compression rod) that are coaxially disposed in the shaft 300. In particular, when the shock absorber 200 is assembled, the rebound needle 518 is disposed in the shaft 300, and the compression needle 520 is disposed in the rebound needle 518 (and, thus, also within the shaft 300). A seal 522 is disposed in a seal gland 524 in the rebound needle 518 to prevent fluid flow between the rebound needle 518 and the shaft 300. The rebound needle 518 and the compression needle 520 are moveable (axially) up and down relative the shaft 300.

In the illustrated example, the rebound needle 518 has a first end 526 and a second end 528 opposite the first end 526. When the shock absorber 200 is assembled, the first end 526 of the rebound needle 518 is coupled to the cap 208. The adjustable piston system 512 includes a rebound needle tip 530 that is coupled (e.g., via threaded engagement) to the second end 528 of the rebound needle 518. In this example, a spacer 532 and a seal 534 are provided that can be disposed within the rebound needle 518 and used to adjust the position of the rebound needle tip 530 relative to the second end 528 of rebound needle 518. The rebound needle tip 530 has a tapered end 536. When the shock absorber 200 is assembled, the tapered end 536 of the rebound needle tip 530 extends into the hollow piston bolt 516 and forms an adjustable rebound orifice, as disclosed in further detail herein. The rebound needle 518 is moveable coaxially in the shaft 300 via the rebound adjust dial 218. The rebound adjust dial 218 can be rotated in one direction or the other to move the rebound needle 518 up and down in the shaft 300, thereby moving the rebound needle tip 530 closer to or further from the hollow piston bolt 516 to affect the size of the adjustable rebound orifice.

In the illustrated example, the compression needle 520 has a first end 538 and a second end 540 opposite the first end 538. When the shock absorber 200 is assembled, the first end 538 of the compression needle 520 is coupled to the cap 208. A ball 541 is disposed between the first end 538 of the compression needle 520 and the internal components of the compression adjust lever 220. The ball 541 operates as an interface to provide smooth operation between the compression needle 520 and a cam actuated by the compression adjust lever 220. In some examples, the ball 541 is constructed of a softer material (e.g., aluminum) so that any wear is biased to the ball 541, which is easy and inexpensive to replace. The adjustable piston system 512 includes a compression needle tip 542 that is coupled to the compression needle 520. In particular, the compression needle tip 542 has a first end 544 and a second end 546 opposite the first end 544. The first end 544 of the compression needle tip 542 is coupled (e.g., via threaded engagement) to the second end 540 of the compression needle 520. As shown in FIG. 5, the compression needle tip 542 has first openings 548 (one of which is referenced in FIG. 5) closer to the first end 544, and second openings 550 (one of which is referenced in FIG. 5) closer to the second end 546. The compression needle tip 542 has an internal passage (shown in further detail in connection with FIG. 10) that connects the first and second openings 548, 550. This internal passage forms a portion of the low flow rebound flow path, disclosed in further detail herein connection with FIG. 10. While in the illustrated example multiple first and second openings 548, 550 are formed in the compression needle tip 542, in other examples, only one first and one second opening may be provided.

When the shock absorber 200 is assembled, the compression needle tip 542 extends through the piston body 514 and forms an adjustable compression orifice with an opening in a bottom of the piston body 514, as disclosed in further detail herein. The compression needle tip 542 has a tapered seat 552. The compression needle 520 is moveable coaxially in the rebound needle 518 (and in the shaft 300) via the compression adjust lever 220. The compression adjust lever 220 may be turned in one direction or the other to move the compression needle 520 up or down in the shaft 300, thereby moving the compression needle tip 542 relative to the piston body 514. In some examples, the compression adjust lever 220 is moveable between two or more discrete positions.

In the illustrated example, the adjustable piston system 512 includes a compression check valve 554. The compression check valve 554 may be implemented as a shim valve that includes a compression check plate and one or more shims, as disclosed in further detail in connection with FIG. 7. When the hollow piston bolt 516 is coupled to the second end 502 of the shaft 300, the compression check valve 554 is disposed between the piston body 514 and the second end 502 of the shaft 300. In the illustrated example, the adjustable piston system 512 also includes a lift plate 556, a seal 558, and a rebound check valve 560. When the shock absorber 200 is assembled, the lift plate 556, the seal 558, and the rebound check valve 560 are coupled to the compression needle tip 542 near the second end 546. In particular, the compression needle tip 542 extends through the lift plate 556, the seal 558, the rebound check valve 560, and a nut 562 is coupled to the second end 546 of the compression needle tip 542. In the illustrated example, the rebound check valve 560 is implemented as a shim valve that includes a rebound check plate 564 and one or more low resistance rebound check shims 566. When assembled, the rebound check plate 564 is aligned with the second openings 550 on the compression needle tip 542.

Figure 6:
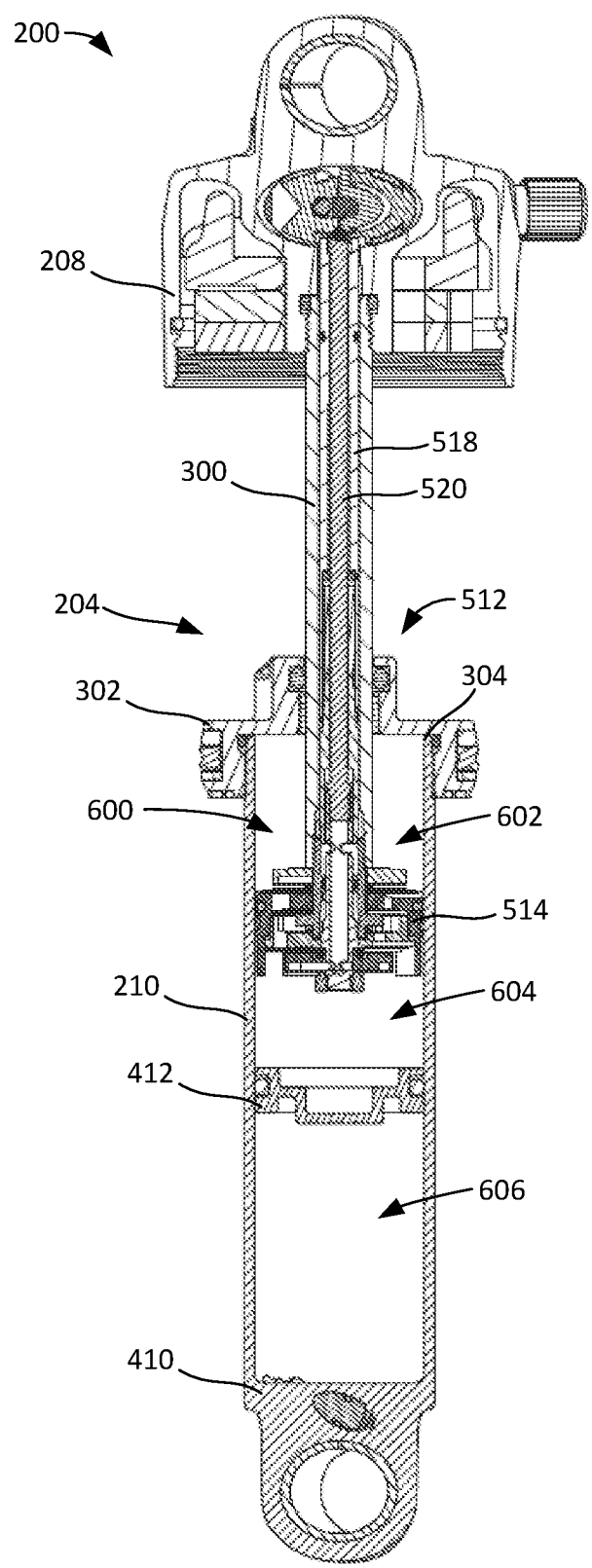
FIG. 6 is a cross-sectional view of the example shock absorber with the example damper taken along line A-A in FIG. 2.

FIG. 6 is a cross-sectional view of the shock absorber 200 including the damper 204 taken along line A-A of FIG. 2. The air can 206 is not shown for clarity. As shown in FIG. 6, the shaft 300 is coupled to and extends (downward in FIG. 6) from the cap 208. The fixed piston 302 is coupled (e.g., via threaded engagement) to the top end 304 of the damper body 210. The damper body 210 defines a chamber 600 that is filled with fluid. The fluid may be, for example, oil, such as a mineral oil based damping fluid. In other examples, other types of damping fluids may be used (e.g., silicon or glycol type fluids). The shaft 300 extends through the fixed piston 302 and into the chamber 600. The piston body 514 is coupled to the shaft 300 and slidably received within the damper body 210. As shown in FIG. 6, the piston body 514 divides the chamber 600 into a first chamber 602 and a second chamber 604.

As used herein, a compression stroke refers to the movement that occurs when the piston body 514 is moved (slid) downward toward the bottom end 410 of the damper body 210 and away from the top end 304 of the damper body 210. A compression stroke can be caused by any external force that moves the ends of the shock absorber 200 (e.g., the top of the cap 208 and the bottom of the damper body 210) toward each other, thereby compressing the shock absorber 200. This may occur, for example, when a rider rides over an object that causes the rear wheel 106 (FIG. 1) to be rotated upward toward the frame 102 (FIG. 1), when a rider comes down off of a jump and lands hard on the ground, etc. This movement causes an increased pressure of the fluid in the second chamber 604 and a decreased pressure of the fluid in the first chamber 602. A compression stroke may occur at faster speeds or slower speeds. During a compression stroke, fluid flows through one or more compression flow paths and across the piston body 514 from the second chamber 604 to the first chamber 602, as disclosed in further detail herein. Conversely, a rebound stroke refers to the movement that occurs when the piston body 514 is moved (slid) in the opposite direction, i.e., away from the bottom end 410 of the damper body 210 and toward the top end 304 of the damper body 210. The rebound movement is driven by the spring 202 (FIG. 2), such as the air can 206, of the shock absorber 200. For example, after the compressive force is removed, the air can 206 (FIG. 2) causes the damper body 210 to move away from the cap 208, which causes the piston body 514 to slide (upward) in the chamber 600 in FIG. 6, thereby expanding the shock absorber 200. This movement causes an increased pressure of the fluid in the first chamber 602 and a decreased pressure of the fluid in the second chamber 604. During a rebound stroke, fluid flows through one or more rebound flow paths and across the piston body 514 from the first chamber 602 to the second chamber 604, as disclosed in further detail here. The adjustable piston system 512 disclosed herein is configured to control the flow of fluid through or across the piston body 514 between the first and second chamber portions, thereby affecting the compression and rebound damping rates. In particular, in this example, the adjustable piston system 512 is configured to enable independent adjustment of the low speed compression and the low speed rebound, as well as independent adjustment of the high speed compression and the high speed rebound. As disclosed in further detail herein, the piston body 514 includes an arrangement of circuits or flow paths across the piston body 514 that enables controlled fluid flow between the first and second chamber 602, 604 during compression and rebound.

As shown in FIG. 6, the rebound needle 518 is coaxially disposed in the shaft 300. The rebound needle 518 is axially moveable in the shaft 300 via the rebound adjust dial 218 (FIG. 2). The rebound needle 518 may be moved up or down to adjust the rebound damping rate of the shock absorber 200. Similarly, the compression needle 520 is coaxially disposed in the rebound needle 518. The compression needle 520 is axially moveable in the rebound needle 518 via the compression adjust lever 220 (FIG. 2). The compression needle 520 may be moved up or down to adjust the compression damping rate of the shock absorber 200.

As shown in FIG. 6, the IFP 412 is disposed in the chamber 600 of the damper body 210. The IFP 412 separates the fluid in the second chamber 604 from a pneumatic pressure chamber 606 having a pneumatic fluid, such as air or nitrogen. The pneumatic fluid may be supplied or removed via the second fill port 402 (FIG. 4). The IFP 412 is moveable upward or downward based on the pressure differential across the IFP 412. The IFP 412 provides pressure on the fluid (e.g., oil) in the second chamber 604 to force the fluid through the flow paths in the piston body 514 and prevent cavitation on the piston body 514. The IFP 412 also compensates for the volume that the shaft 300 consumes when inserted into the damper body 210 (e.g., during assembly).

Figure 7:
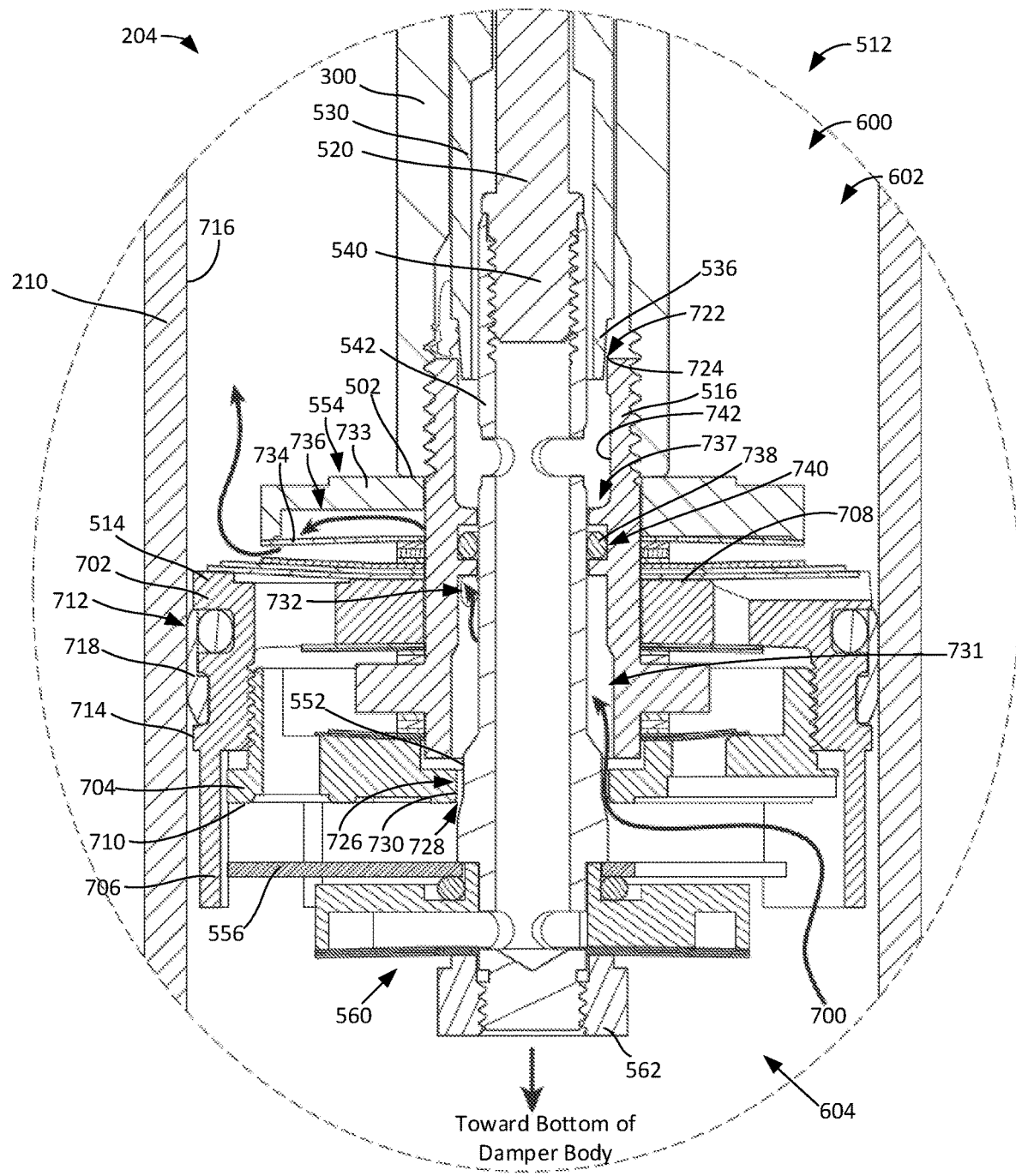
FIG. 7 is an enlarged cross-sectional view of an example adjustable piston system implemented in connection with the example damper of FIG. 2 illustrating an example low flow compression flow path.

FIG. 7 is an enlarged cross-sectional view of the adjustable piston system 512 illustrating a first compression flow path 700, referred to herein as a low flow compression flow path 700, along which the fluid flows during a low speed compression stroke. In the illustrated example of FIG. 7, the piston body 514 is a dual piston body that includes a primary part 702 (e.g., a first piston) and a secondary part 704 (e.g., a secondary piston) coupled (e.g., via threaded engagement) to the primary part 702. The secondary part 704 has a smaller diameter than the primary part 702 and is disposed within the primary part 702. In other examples, the piston body 514 may be constructed of a single unitary part or component, or may be constructed of more than two piston parts or components. In the illustrated example, the piston body 514 has a wall 706 that extends beyond the secondary part 704. As disclosed in further detail in connection with FIG. 12, the wall 706 may be used to prevent collision with the IFP 412 (FIG. 4). The piston body 514 has a first side 708 (e.g., a top side) and a second side 710 (e.g., a bottom side) opposite the first side 708. In the illustrated example, a seal assembly 712 is disposed between an outer surface 714 of the piston body 514 and an inner surface 716 of the damper body 210 to prevent fluid from leaking past the piston body 514. The seal assembly 712 may include one or more seals (e.g., an o-ring, an expansion ring, etc.). In the illustrated example, the seal assembly 712 includes a wear ring 718. The wear ring 718 prevents direct contact (e.g., metal-to-metal contact) between the piston body 514 and the inner surface 716 of the damper body 210, thereby prolonging the life of the piston body 514 and the damper body 210. The wear ring 718 may be constructed of a softer material, such that any wear is biased to the wear ring 718, which is easy and inexpensive to replace. In the illustrated example, the hollow piston bolt 516 couples the piston body 514 to the second end 502 of the shaft 300. The compression check plate 554 is coupled between the first side 708 of the piston body 514 and the second end 502 of the shaft 300. The hollow piston bolt 516 extends a least partially into the piston body 514.

As shown in FIG. 7, the rebound needle tip 530 is coaxially disposed in the shaft 300. In this example, the adjustable piston system 512 includes an adjustable rebound orifice 722. The adjustable rebound orifice 722 forms part of a first rebound flow path (disclosed in further connection with FIG. 10) to control the flow of fluid from the first chamber 602 to the second chamber 604 through the piston body 514 during a rebound stroke. In this example, the adjustable rebound orifice 722 is formed between the tapered end 536 of the rebound needle tip 530 and an inner peripheral edge 724 of the hollow piston bolt 516. However, in other examples, the adjustable rebound orifice 722 may be formed between the rebound needle tip 530 and another edge or surface of the hollow piston bolt 516 and/or the shaft 300. In the illustrated example, the adjustable rebound orifice 722 is open, which allows fluid to flow through the adjustable rebound orifice 722 during a rebound stroke. The rebound needle tip 530 can be moved further from or closer to (e.g., into engagement with) the hollow piston bolt 516, thereby changing the size of the adjustable rebound orifice 722 and, thus, affecting the flow of fluid through the adjustable rebound orifice 722. Examples of this operation are described in further detail in connection with FIGS. 10 and 11.

As shown in FIG. 7, the compression needle tip 542 is coupled to the second end 540 of the compression needle 520, which is disposed in the rebound needle tip 530. The compression needle tip 542 extends through the hollow piston bolt 516 and outward through an opening 726 in the secondary part 704. In this example, the adjustable piston system 512 includes an adjustable compression orifice 728. The adjustable compression orifice 728 forms part of the low flow compression flow path (disclosed further below) to control the flow of fluid from the second chamber 604 to the first chamber 602 through the piston body 514 during a compression stroke. In this example, the adjustable compression orifice 728 is formed between the compression needle tip 542 and an inner peripheral edge 730 defining the opening 726 in the secondary part 704. The tapered seat 552 of the compression needle tip 542 is disposed within the opening 726. In the illustrated example, the adjustable compression orifice 728 is open, which allows fluid to flow through the adjustable compression orifice 728 during a compression stroke. The compression needle tip 542 can be moved up or down in the opening 726 to adjust the size of the adjustable compression orifice 728, thereby affecting the flow of fluid through the adjustable compression orifice 728.

During a low speed compression stroke, the piston body 514 is moved downward in FIG. 7 relative to the damper body 210 (as shown by the direction of the arrow), toward the bottom end 410 (FIG. 4) of the damper body 210. If the adjustable compression orifice 728 is open, as shown in FIG. 7, this movement causes the fluid in the chamber 600 to flow through or across the piston body 514 from the second chamber 604 to the first chamber 602 along the low flow compression flow path 700. In particular, the fluid flows from the second chamber 604 and between the lift plate 556 and the second side 710 of the piston body 514. The fluid flows through the adjustable compression orifice 728 and into an internal passage 731 of the hollow piston bolt 516. The hollow piston bolt 516 includes an opening 732 that connects the internal passage 731 to the compression check valve 554. The fluid flows through the compression check valve 554 and out into the first chamber 602. In the illustrated example, the compression check valve 554 is a shim valve that includes a compression check plate 733 and one or more low resistance compression check shim(s) 734 that cover and inner area 736 of the compression check plate 733. The compression check valve 554 enables flow of fluid through the low flow compression flow path 700 during a compression stroke but prevents the flow of fluid into the low flow compression flow path 700 during a rebound stroke. The fluid flows into the inner area 736 of the compression check plate 733 and forces the low resistance compression check shim(s) 734 to bend open, thereby enabling the fluid to flow into the first chamber 602. This flow of fluid through the adjustable compression orifice 728 and across the low resistance compression check shims 734 dampens or slows the movement of the fluid, thereby dampening movement of the shock absorber 200 during compression.

In the illustrated example of FIG. 7, the adjustable piston system 512 includes an isolation member 737 disposed between the adjustable rebound orifice 722 and the adjustable compression orifice 728 that isolates or separates the low flow compression flow path 700 and a first rebound flow path 1000 (which is shown and described in connection with FIG. 10). As such, the isolation member 737 prevents fluid from leaking between the two flow paths while the adjustable rebound orifice 722 and the adjustable compression orifice 728 are open. In known piston systems, no such isolation member is provided. Instead, in these known piston systems, the internal passage through the hollow piston bolt is open between the rebound orifice and the compression orifice. As such, the rebound and compression flow paths share a common flow path. When both of the orifices are open, though, leakage occurs between the orifices during rebound and compression, rather than following the intended fluid flow paths. This results in significant loss in damping, because the fluid can flow freely through the piston body between the first and second chambers 602, 604, rather than across the designated check valves that are intended to add resistance to the fluid flow. Therefore, the example damper 204 includes the isolation member 737 to prevent such leakage between the adjustable rebound and compression orifices 722, 728.

In this example, the isolation member 737 includes a seal 738 that is disposed between the hollow piston bolt 516 and the compression needle tip 542. The seal 738 prevents fluid from flowing through the internal passage 731 of the hollow piston bolt 516 between the adjustable rebound orifice 722 and the adjustable compression orifice 728, as is experienced in known piston systems. The seal 738 is disposed in a seal gland 740 formed on an inner surface 742 of the hollow piston bolt 516. The seal 738 forms a sealing engagement between the inner surface 742 of the hollow piston bolt 516 and an outer surface of the compression need tip 542 to prevent the flow of fluid through the hollow piston bolt 516 and the compression needle tip 542 between the adjustable rebound orifice 722 and the adjustable compression orifice 728. In some examples, the seal 738 is an o-ring. However, in other examples, other types of seals may be implemented (e.g., a metal ring seal). Further, in other examples, other types of structures may be implemented as the isolation member 737.

In the illustrated example, the adjustable piston system 512 also includes the rebound check valve 560. During compression, the rebound check valve 560 closes off the first rebound flow path 1000 (disclosed in further detail in connection with FIG. 10) that connects the adjustable rebound orifice 722 and the second chamber 604. As such, during compression, the rebound check valve 560 prevents the flow of fluid through the first rebound flow path 1000 and toward the adjustable rebound orifice 722 and, thus, prevents the flow of fluid from the second chamber 604 to the first chamber 602 along the first rebound flow path 1000. In the illustrated example, the rebound check valve 560 is disposed in the second chamber 604. The rebound check valve 560 is coupled at or near the end of the compression need tip 542 via the nut 562. In this example, the rebound check valve 560 is coupled to and movable with the compression needle tip 542 relative to the piston body 514. In the illustrated example, the lift plate 556 is disposed between the rebound check valve 560 and the piston body 514.

Figure 8:
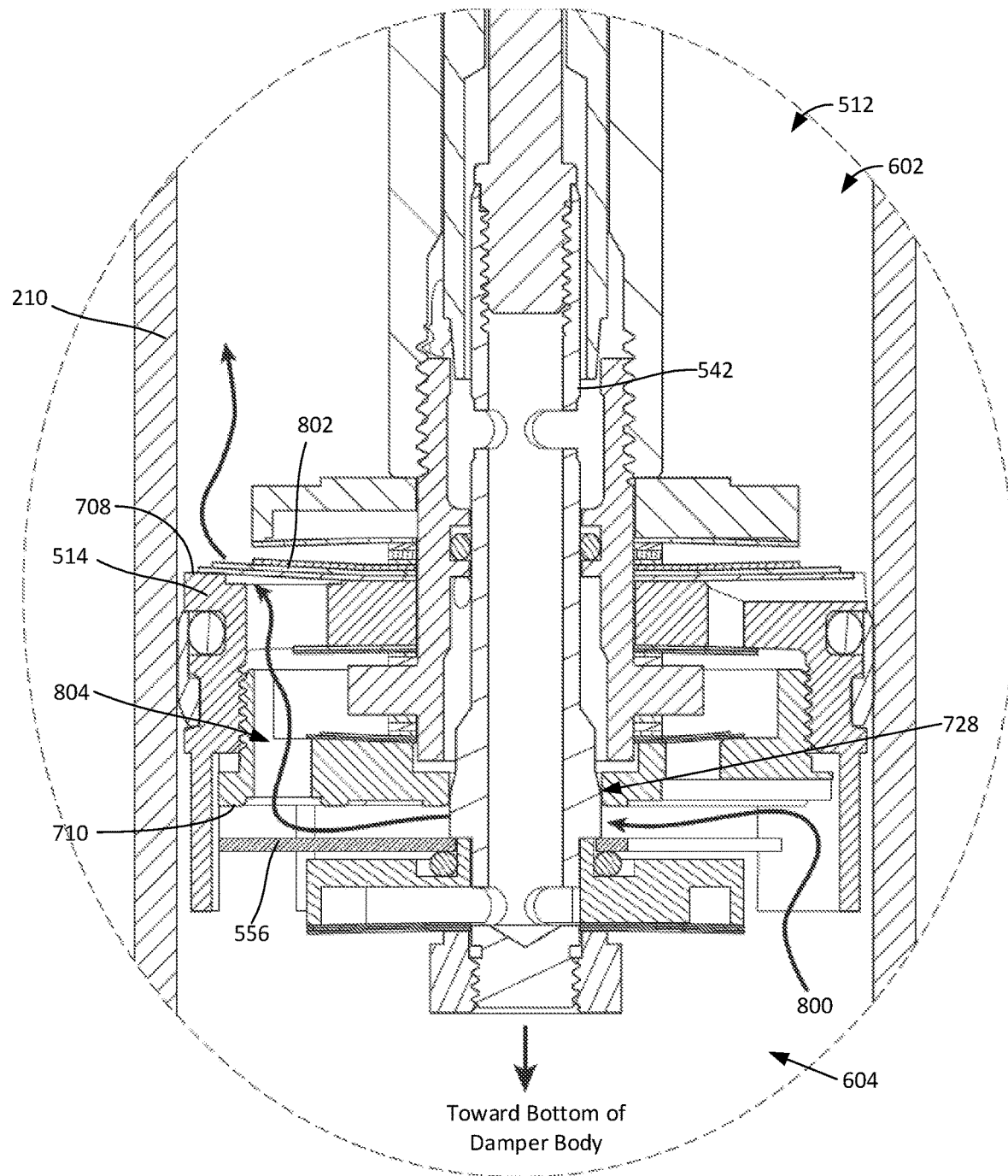
FIG. 8 illustrates the example adjustable piston system of FIG. 7 showing an example high flow compression flow path.

FIG. 8 illustrates a second compression flow path 800, referred to herein as a high flow compression flow path 800, along which the fluid flows during a high speed compression stroke. The high flow compression flow path 800 enables a higher flow of fluid across the piston body 514 than the low flow compression flow path 700 of FIG. 7. In FIG. 8, the compression needle tip 542 has been moved upward (e.g., via actuation of the compression adjust lever 220 (FIG. 2) relative to the piston body 514. As a result, the adjustable compression orifice 728 is closed. As mentioned above, during a compression stroke, the piston body 514 is moved downward in FIG. 8 relative to the damper body 210 (as shown by the direction of the arrow), toward the bottom end 410 (FIG. 4) of the damper body 210. During a high speed/high force compression stroke, the pressure of the fluid in the second chamber 604 increases rapidly. If the adjustable compression orifice 728 is closed, as in FIG. 8, and a threshold pressure is reached, the fluid is pushed through the high flow compression flow path 800, disclosed below. Additionally, even if the adjustable compression orifice 728 is open (such as shown in FIG. 7), the size of the adjustable compression orifice 728 may not large enough to accommodate such a high fluid flow during a high speed compression event. In some such examples, this large pressure differential also causes the fluid to flow through the high flow compression flow path 800. Therefore, in some examples, fluid may flow through both flow paths 700, 800 simultaneously.

During high speed compression, the piston body 514 is moved downward in FIG. 8 relative to the damper body 210. This movement may cause the fluid to flow across the piston body 514 from the second chamber 604 to the first chamber 602 along the high flow compression flow path 800. As shown in FIG. 8, the fluid flows from the second chamber 604 and between the lift plate 556 and the second side 710 of the piston body 514 into an outer passageway 804 in the piston body 514. The piston system 512 includes high resistance compression shims 802 that cover the outer passageway 804 on the first side 708 of the piston body 514. The high resistance compression shims 802 are preloaded. When a threshold pressure differential across the first and second chambers 602, 604 is reached, the pressure of the fluid in the outer passageway 804 causes the high resistance compression shims 802 to bend away from the first side 708 of the piston body 514, thereby enabling the fluid to flow through the outer passageway 804 and into the first chamber 602 at a relatively high flow rate.

As can be appreciated, adjusting the size of the adjustable compression orifice 728 affects the low speed compression flow rate through the low flow compression flow path 700 (FIG. 7). For instance, when the adjustable compression orifice 728 is larger, more fluid flow is allowed, which reduces the damping effect. When the adjustable compression orifice 728 is smaller or closed, less fluid flow is allowed, which increases the damping effect. Further, adjusting the size of the adjustable compression orifice 728 also affects the point at which the high flow compression flow path 800 opens because the pressure in the second chamber 604 builds faster when less fluid is able to flow through the low flow compression flow path 700. In particular, the threshold pressure to open the high resistance compression shims 802 is reached faster if less fluid flow is allowed through the adjustable compression orifice 728 during a compression stroke.

Figure 9:
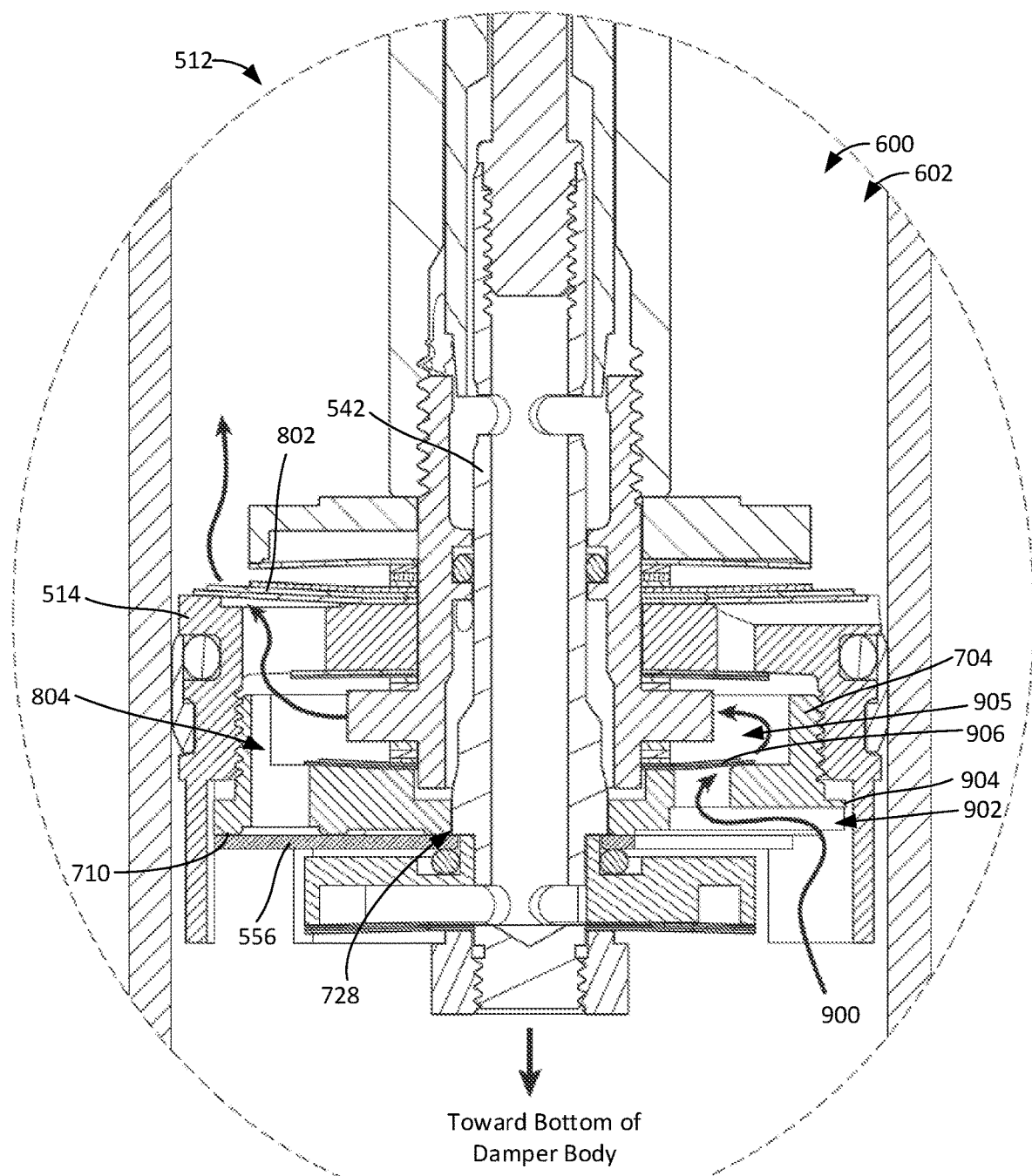
FIG. 9 illustrates the example adjustable piston system of FIG. 7 showing an example lockout mode.

FIG. 9 illustrates a third compression flow path 900, referred to herein as a lockout flow path 900, that may be exhibited during a lockout mode. In particular, in some examples, the adjustable piston system 512 is operable in a lockout mode that provides relatively high damping to substantially limit movement of the shock absorber 200. To set the shock absorber 200 in the lockout mode, the compression needle tip 542 is moved upward until the lift plate 556 engages the second side 710 of the piston body 514. In this position, the lift plate 556 blocks the outer passageway 804 and the adjustable compression orifice 728. Thus, fluid is prevented from flowing into the outer passageway 804 (from the second side 710) and the adjustable compression orifice 728. However, the second side 710 of the piston body 514 has a slot 902 that extends from an outer edge 904 of the secondary part 704 to an inner passageway 905 of the secondary part 704. Therefore, even when the lift plate 556 is pressed against the second side 710 of the piston body 514, fluid can still flow through the slot 902 to the inner passageway 905 of the piston body 514. In the illustrated example, the adjustable piston system 512 includes a lockout shim 906 that covers the inner passageway 905 in the secondary part 704. When the pressure is above a threshold, the fluid forces the lockout shim 906 to bend open. The fluid flows from the inner passageway 905 to the outer passageway 804, and from the outer passageway 804 across the high resistance compression shim 802 and into the first chamber 602. Therefore, in this lockout mode, the adjustable piston system 512 still allows some movement under relatively high forces, such as where a rider comes down off of a jump and lands hard on the ground. This enables a blow off of some of the pressure in the chamber 600.

As described above, after compression of the shock absorber 200, the spring 202 (e.g., the air can 206) (FIG. 2) causes the shock absorber 200 to rebound or expand (referred to as a rebound stroke). The amount of force provided by the spring 202 is proportional to the amount of compression of the spring 202 (and, thus, the length of the compression stroke) during compression of the shock absorber 200. Therefore, a smaller length compression stroke is generally followed by a smaller or lower speed rebound stroke, whereas a larger compression stroke is generally followed by a larger or higher speed rebound stroke. Similar to the high flow and low flow compression flow paths 700, 800 disclosed above, the example adjustable piston system 512 includes two rebound flow paths for enabling fluid to flow across the piston body 512 from the first chamber 602 to the second chamber 604 during a rebound stroke. Unlike a compression stroke, which is caused by a varying amount of compressive force, the rebound force is generally the same for each rebound stroke. In particular, the rebound force is provided by the spring (FIG. 2) and, thus, is based on the amount of compression of the spring 202 and the spring constant of the spring 202. For instance, each time the shock absorber 200 is compressed a same distance and released, the spring 202 applies generally the same return force to expand the shock absorber 200 back to the initial position. Controlling the fluid flow across the piston body 514 can be used to provide more or less dampening and, thus, can be used to affect the speed at which rebound occurs (i.e., the time it takes to expand the shock absorber 200 back to the initial position). FIG. 10 illustrates a first rebound flow path 1000 and FIG. 11 illustrates a second rebound flow path 1100. As disclosed in further detail below, the two rebound flow paths are selectable. The first and second flow paths 1000, 1100 have different characteristics, such as different flow path lengths, number of turns, and/or number or stiffness of shims that affect the resistances across the piston body 514 and, thus, result in different responses of the damper 204 during rebound.

Figure 10:
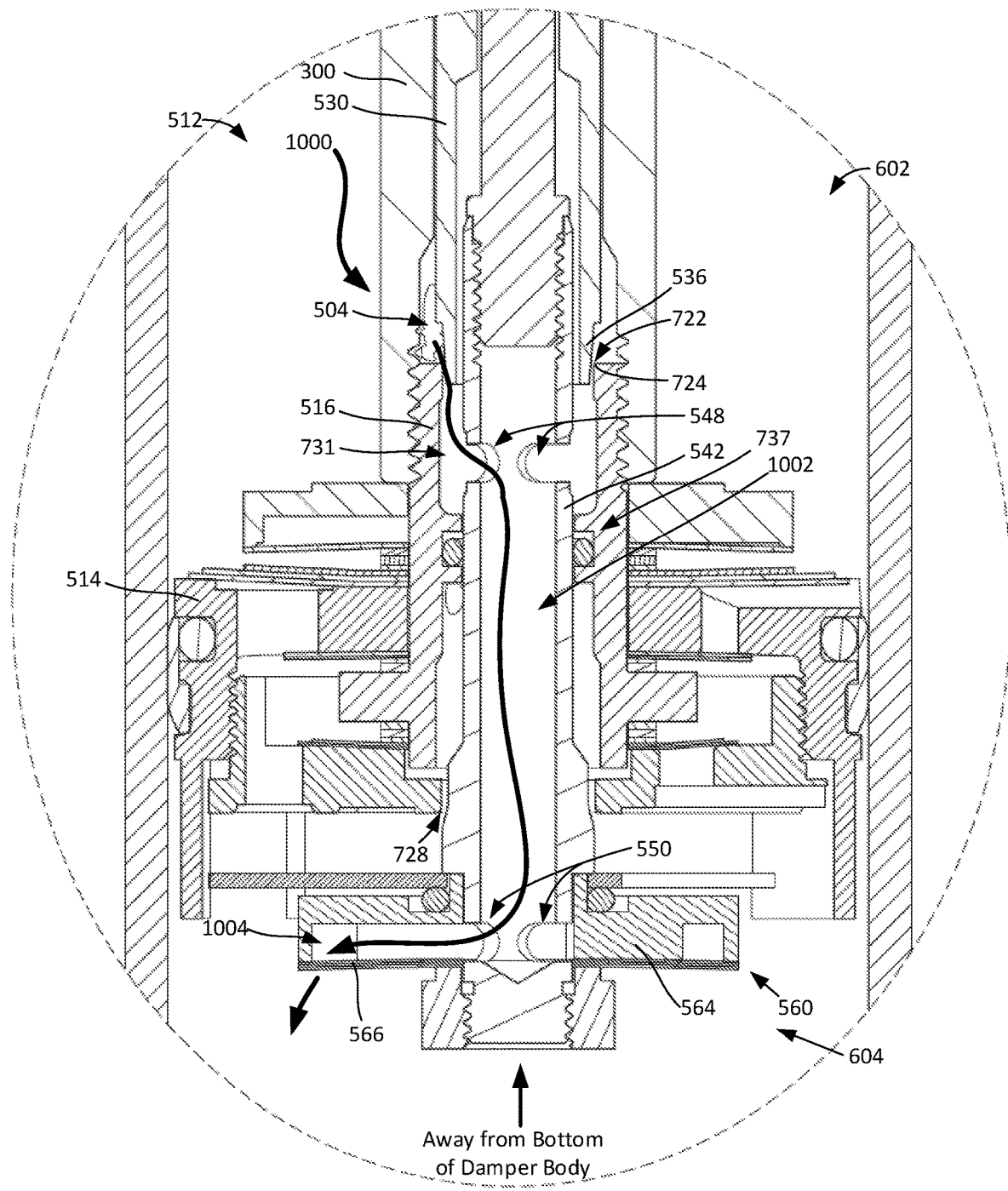
FIG. 10 illustrates the example adjustable piston system of FIG. 7 showing an example first rebound flow path.
Figure 11:
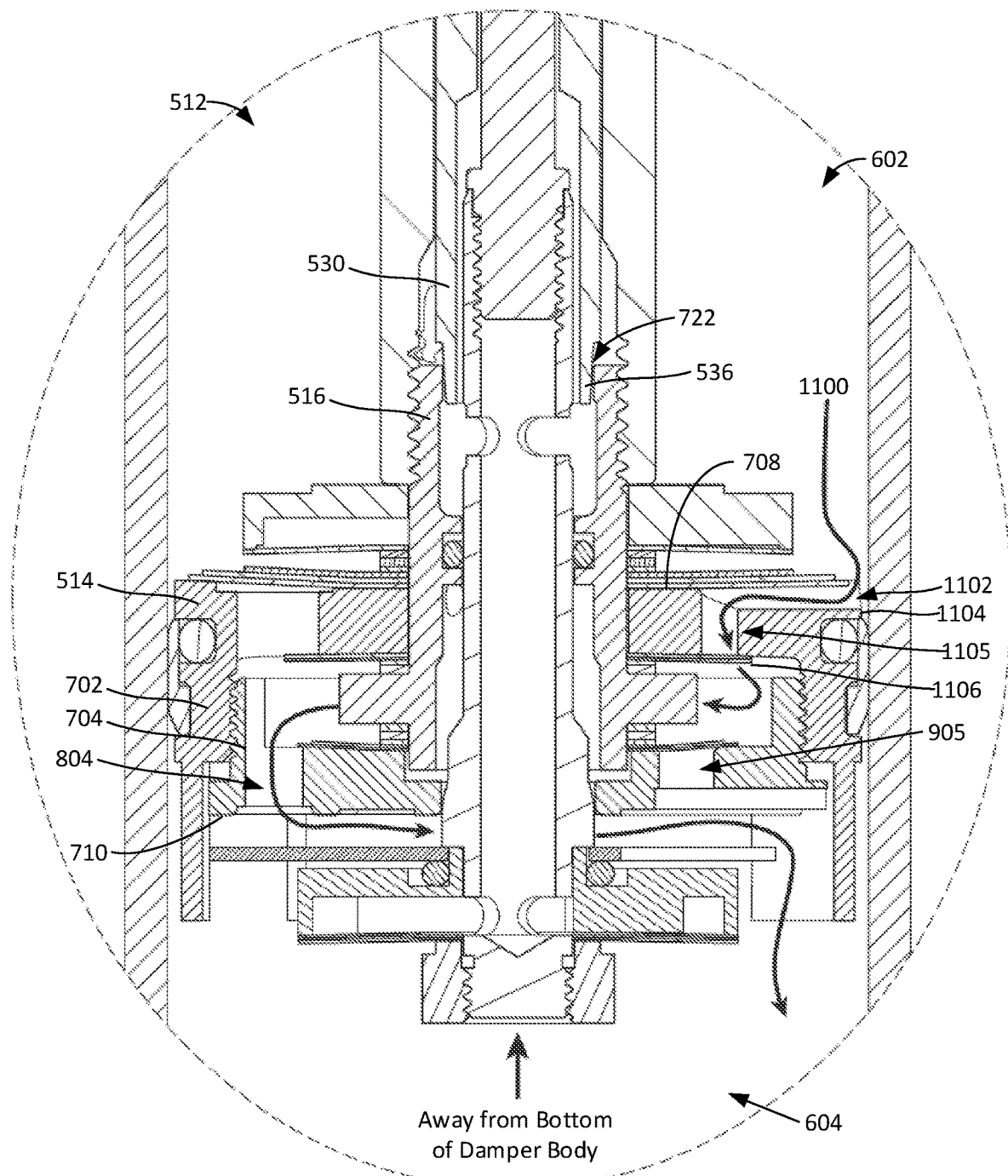
FIG. 11 illustrates the example adjustable piston system of FIG. 7 showing an example second rebound flow path.

FIG. 10 illustrates the first rebound flow path 1000 along which the fluid may flow during a rebound stroke. In particular, the fluid flows along the first flow path 1000 during a rebound stroke when the adjustable rebound orifice 722 is open. The adjustable rebound orifice 722 may be opened by a user (e.g., by selecting a position of the adjustable rebound dial 218 (FIG. 2)). During a rebound stroke, the piston body 514 is moved (upward) relative to the damper body 210 (as shown by the direction of the arrow), away from the bottom end 410 (FIG. 4) of the damper body 210, which increases pressure in the first chamber 602 and decreases pressure in the second chamber 604.

As shown in FIG. 10, the adjustable rebound orifice 722 is formed by the tapered end 536 of the rebound needle tip 530 and the inner peripheral edge 724 of the hollow piston bolt 516. During a rebound stroke when the adjustable rebound orifice 722 is open, as shown in FIG. 10, fluid flows across the piston body 514 from the first chamber 602 to the second chamber 604 along the first rebound flow path 1000. In particular, fluid flows from the first chamber 602 and through the inlet opening 504 into the shaft 300. The fluid flows through the adjustable rebound orifice 722, through the internal passage 731 of the hollow piston bolt 516, and through the first openings 548 in the compression needle tip 542 into an internal passage 1002 in the compression needle tip 542. The internal passageway 1002 fluidly couples the first openings 548 and the second openings 550. The fluid flows through the compression needle tip 542 and out of the second openings 550 in the compression needle tip 542. The fluid then flows through the rebound check valve 560 and into the second chamber 604. In particular, the fluid flows into an inner area 1004 of the rebound check plate 564. The low resistance rebound check shim(s) 566 are coupled to the rebound check plate 564 and cover the inner area 1004 of the rebound check plate 564. When a threshold pressure differential is reached, the fluid bends the low resistance rebound check shims 566 open and away from the rebound check plate 564 such that the fluid flows into the second chamber 604. However, during a compression stroke, the low resistance rebound check shim(s) 566 prevent the flow of fluid into the rebound check plate 564 and through the low flow rebound flow path 1000. As can be appreciated, the first rebound flow path 1000 provides relatively low resistance, which enables the fluid to flow relatively easily from the first chamber 602 to the second chamber 604 during a rebound stroke. As such, less damping occurs when the adjustable rebound orifice 722 is open. Therefore, the shock absorber 200 rebounds or expands relatively quickly when the adjustable rebound orifice 722 is open.

In the illustrated example, the adjustable compression orifice 728 is open. However, the state of the adjustable compression orifice 728 does not affect the rebound flow rate. The low speed rebound occurs the same as described above even if the adjustable compression orifice 728 is closed (e.g., as shown in FIG. 8) or in the lockout mode (e.g., as shown in FIG. 9), because the compression flow paths are independent of the rebound flow paths.

As can been appreciated from FIG. 10, the isolation member 737 isolates the first rebound flow path 1000 from the low speed compression flow path 700 (FIG. 7) by separating the adjustable rebound orifice 722 from the adjustable compression orifice 728. Therefore, even when the adjustable compression orifice 728 is open (as shown in FIG. 10), the fluid does not flow from the adjustable rebound orifice 722 to the adjustable compression orifice 728 during rebound. Instead, the fluid only flows along the first rebound flow path 1000 and out of the rebound check valve 560 into the second chamber 604, thereby ensuring some resistance is encountered by the fluid to create the damping effect.

FIG. 11 illustrates the second rebound flow path 1100 that may be experienced during a rebound stroke. In FIG. 11, the adjustable rebound orifice 722 has been closed. In particular, the tapered end 536 of the rebound needle tip 530 is engaged with the hollow piston bolt 516. As such, the adjustable rebound orifice 722 is closed, thereby preventing the flow of fluid through the first flow rebound flow path 1000 (FIG. 10). This position of the adjustable rebound orifice 722 may be set by a user (e.g., by selecting a position of the adjustable rebound dial 218). During a rebound stroke, the spring 202 (FIG. 2) creates a force that biases the piston body 514 away from the bottom 410 (FIG. 4) of the damper body 210. As such, the pressure of the fluid in the first chamber 602 increases. When the adjustable rebound orifice 722 is closed, the fluid is pushed through the second rebound flow path 1100 instead of the first rebound flow path 1000 (FIG. 10).

As shown in FIG. 11, a slot 1102 is formed in the first side 708 of the piston body 514 that extends from an outer edge 1104 of the primary part 702 to an inner passageway 1105 of the piston body 514. During a rebound stroke when the adjustable rebound orifice 722 is closed, fluid flows from the first chamber 602 and through the slot 1102 into the inner passageway 1105 in the primary part 702. The adjustable piston system 512 includes one or more high resistance rebound shims 1106 covering the inner passageway 1105 in the primary part 702. When the pressure of the fluid exceeds a threshold, the fluid causes the high resistance rebound shims 1106 to bend open. The fluid flows through the inner passageway 905 of the secondary part 704 to the outer passageway 804 of the secondary part 704, and out through the second side 710 of the piston body 514 and into the second chamber 604. As can be appreciated, the second rebound flow path 1100 provides higher resistance than the first rebound flow path 1000 (FIG. 10). Therefore, the fluid flows more slowly through the second rebound flow path 1100 from the first chamber 602 to the second chamber than the first rebound flow path 1000. As a result, when the adjustable rebound orifice 722 is closed, more damping occurs and, thus, the shock absorber 200 rebounds or expands more slowly. Therefore, a user can adjust the adjustable rebound orifice 722 between the open and closed positions to change the speed or time at which it takes for the shock absorber 200 to rebound. In some examples, the rebound adjust dial 218 (FIG. 2) can only be used to set the adjustable rebound orifice 722 to the open position (FIG. 10) (for higher speed rebound) or the closed position (FIG. 11) (for lower speed rebound). In other examples, the rebound adjust dial 218 can be used to also set the adjustable rebound orifice 722 to any position between fully open and fully closed. When the adjustable rebound orifice 722 is larger, more fluid flow is allowed, which reduces the damping effect. When the adjustable rebound orifice 722 is smaller, less fluid flow is allowed, which increases the damping effect. This enables a user to select a desired rebound speed.

Even if the adjustable rebound orifice 722 is open (as shown in FIG. 10), in some instances the pressure of the fluid may be high enough to open the high resistance rebound shims 1106 such that fluid may also flow through the high flow rebound flow path 1100. Therefore, in some examples, fluid may flow through both flow paths 1000, 1100 simultaneously. Adjusting the size of the adjustable rebound orifice 722 also affects the point at which the high flow rebound flow path 1100 opens because the pressure in the first chamber 602 builds faster when less fluid is able to flow through the low flow rebound flow path 1000.

Figure 12:
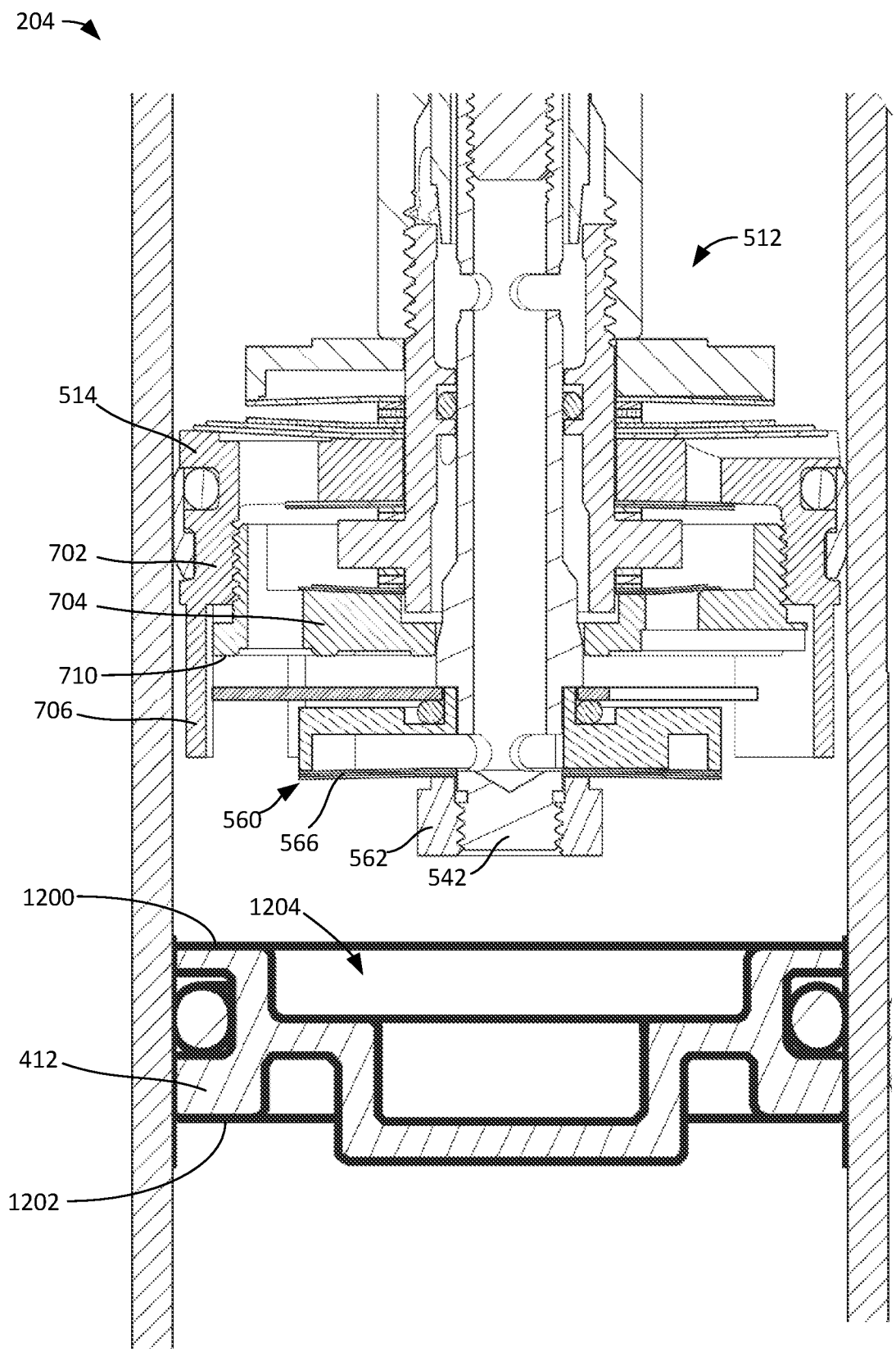
FIG. 12 is an enlarged cross-sectional view of the example damper of FIG. 2 illustrating the example adjustable piston system and an example internal floating piston (IFP).

Also disclosed herein are features that reduce or eliminate potential damage when a collision occurs between the piston body 514 and the IFP 412. For example, FIG. 12 is an enlarged cross-sectional view the damper 204 showing the adjustable piston system 512 and the IFP 412. In the illustrated example, the piston body 514 includes the wall 706 that extends beyond the second side 710 (e.g., a bottom side of the secondary part 704). The IFP 412 has a first side 1200 and a second side 1202 opposite the first side 1200. As shown in FIG. 12, the first side 1200 of the IFP 412 has a recess 1204. In the event of a collision between the piston body 514 and the IFP 412, the wall 706 of the piston body 514 engages the first side 1200 of the IFP 412, and the nut 562 and the rebound check valve 560 on the compression needle tip 542 are accommodated in the recess 1204. The recess 1204 is sized and shaped to receive the nut 562 and the rebound check valve 560 on the compression needle tip 542 even when the compression needle tip 542 is in the fully open position (in which the compression needle tip 542 extends further from the second side 710 of the piston body 514). This prevents the IFP 412 from contacting the nut 562, the rebound check valve 560, the compression needle tip 542, and/or any other parts coupled to the moveable compression needle tip 542, which reduces or eliminates potential damage to these parts. In particular, hard impacts on the compression needle tip 542 could potentially damage the parts associated with the compression adjust lever 220 (FIG. 2) that are used to move the compression needle tip 542 up and down. Further, this type of contact could puncture the low resistance rebound check shims 566 on the rebound check valve 560. As such, the example wall 706 and/or the example recess 1204 reduce or prevent damage to these more sensitive components.

From the foregoing, it will be appreciated that the above disclosed dampers and adjustable piston systems eliminate leaks or cross-flow between the compression and rebound flow paths. As such, the examples disclosed herein enable continued control of the flow of fluid during compression and rebound that is not seen in known piston systems. Thus, the examples disclosed herein improve safety and comfort or a rider of a vehicle having such a damper.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A damper for a bicycle suspension component, the damper comprising:
   a damper body defining a chamber;
   a shaft extending into the chamber of the damper body; and
   an adjustable piston system having a piston body coupled to the shaft, the piston body slidably received within the damper body, the piston body dividing the chamber into a first chamber and a second chamber, the adjustable piston system to control a flow of fluid between the first and second chambers, the adjustable piston system including:
      an adjustable rebound orifice forming part of a rebound flow path to control the flow of fluid from the first chamber to the second chamber across the piston body;
      an adjustable compression orifice forming part of a low flow compression flow path to control the flow of fluid from the second chamber to the first chamber across the piston body;
      an isolation member disposed between the adjustable rebound orifice and the adjustable compression orifice to separate the rebound flow path and the low flow compression flow path;
      a hollow piston bolt coupled to an end of the shaft and extending into the piston body;
      a rebound needle tip disposed in the shaft;
      a compression needle disposed in the rebound needle tip; and
      a compression needle tip coupled to an end of the compression needle and extending through the hollow piston bolt; and
   a rebound check valve coupled to the compression needle tip and moveable with the compression needle tip relative to the piston body.

2. The damper of claim 1, wherein the adjustable piston system further includes a lift plate disposed between the rebound check valve and the piston body.

3. The damper of claim 1, wherein the rebound check valve is coupled at or near an end of the compression needle tip via a nut.

4. The damper of claim 1, wherein, during rebound when the adjustable rebound orifice is open, the rebound flow path enables the flow of fluid from the first chamber through the shaft, the adjustable rebound orifice, the compression needle tip, and the rebound check valve, and into the second chamber.

5. The damper of claim 4, wherein the rebound check valve is to prevent the flow of fluid through the rebound flow path and toward the adjustable rebound orifice during compression.

6. The damper of claim 4, wherein, during low speed compression when the adjustable compression orifice is open, the low flow compression flow path enables the flow of fluid from the second chamber through the adjustable compression orifice, a passageway between the hollow piston bolt and the compression needle tip, an opening in the hollow piston bolt, a compression check valve, and into the first chamber.

7. A damper for a bicycle suspension component, the damper comprising:
   a damper body defining a chamber;
   a shaft extending into the chamber of the damper body; and
   an adjustable piston system having a piston body coupled to the shaft, the piston body slidably received within the damper body, the piston body dividing the chamber into a first chamber and a second chamber, the adjustable piston system to control a flow of fluid between the first and second chambers, the adjustable piston system including:
      an adjustable rebound orifice forming part of a rebound flow path to control the flow of fluid from the first chamber to the second chamber across the piston body;
      an adjustable compression orifice forming part of a low flow compression flow path to control the flow of fluid from the second chamber to the first chamber across the piston body; and
      an isolation member disposed between the adjustable rebound orifice and the adjustable compression orifice to separate the rebound flow path and the low flow compression flow path,
   wherein the isolation member includes a seal disposed in a seal gland formed on an inner surface of a hollow piston bolt, the seal engages the inner surface of the hollow piston bolt and an outer surface of a compression needle tip to prevent the flow of fluid between the hollow piston bolt and the compression needle tip between the adjustable rebound orifice and the adjustable compression orifice.

8. The damper of claim 7, wherein the seal is an o-ring.

9. A damper for a bicycle suspension component, the damper comprising:
   a damper body defining a chamber;
   a shaft extending into the chamber of the damper body; and
   an adjustable piston system having a piston body coupled to the shaft, the piston body slidably received within the damper body, the piston body dividing the chamber into a first chamber and a second chamber, the adjustable piston system to control a flow of fluid between the first and second chambers, the adjustable piston system including:
      an adjustable rebound orifice forming part of a rebound flow path to control the flow of fluid from the first chamber to the second chamber across the piston body;
      an adjustable compression orifice forming part of a low flow compression flow path to control the flow of fluid from the second chamber to the first chamber across the piston body; and
      an isolation member disposed between the adjustable rebound orifice and the adjustable compression orifice to separate the rebound flow path and the low flow compression flow path; and
   the damper further including an internal floating piston disposed in the chamber of the damper body, wherein the piston body includes a primary part and a secondary part coupled to the primary part, and wherein the piston body has a wall extending beyond a bottom side of the secondary part, the wall to engage the internal floating piston to prevent contact between the internal floating piston and a compression needle tip of the adjustable piston system.

10. A damper for a bicycle suspension component, the damper comprising:
    a damper body defining a chamber;
    a shaft extending into the chamber of the damper body; and
    an adjustable piston system having a piston body coupled to the shaft, the piston body slidably received within the damper body, the piston body dividing the chamber into a first chamber and a second chamber, the adjustable piston system defining a flow path between the first chamber to the second chamber across the piston body, the adjustable piston system including:
- a compression needle tip extending through the piston body, the compression needle tip moveable relative to the piston body; and
- a check valve coupled to the compression needle tip and moveable with the compression needle tip relative to the piston body, the check valve to enable a flow of fluid through the flow path from the first chamber to the second chamber and prevent the flow of fluid through the flow path from the second chamber to the first chamber,
- wherein the check valve includes a rebound check plate coupled to the compression needle tip and a check shim coupled to the rebound check plate.

11. The damper of claim 10, wherein the check shim prevents the flow of fluid into the rebound check plate and through the flow path during compression.

12. The damper of claim 10, wherein the flow path is a rebound flow path, the adjustable piston system further defining a low flow compression flow path, wherein the adjustable piston system further includes:
- an adjustable rebound orifice forming part of the rebound flow path;
- an adjustable compression orifice forming part of the low flow compression flow path; and
- an isolation member disposed between the adjustable rebound orifice and the adjustable compression orifice to separate the rebound flow path and the low flow compression flow path.

13. The damper of claim 12, wherein the adjustable piston system further includes a hollow piston bolt, the compression needle tip extending through the hollow piston bolt, the isolation member disposed between an inner surface of the hollow piston bolt and an outer surface of the compression needle tip.

14. A damper for a bicycle suspension component, the damper comprising:
- a damper body defining a chamber;
- a shaft extending into the chamber of the damper body; and
- an adjustable piston system having a piston body coupled to the shaft, the piston body slidably received within the damper body, the piston body dividing the chamber into a first chamber and a second chamber, the adjustable piston system defining a flow path between the first chamber to the second chamber across the piston body, the adjustable piston system including:
  - a compression needle tip extending through the piston body, the compression needle tip moveable relative to the piston body; and
  - a check valve coupled to the compression needle tip and moveable with the compression needle tip relative to the piston body, the check valve to enable a flow of fluid through the flow path from the first chamber to the second chamber and prevent the flow of fluid through the flow path from the second chamber to the first chamber,
  - wherein the compression needle tip has an internal passage that forms a portion of the flow path.

15. A damper for a bicycle suspension component, the damper comprising:
- a damper body defining a chamber;
- a shaft extending into the chamber of the damper body; and
- an adjustable piston system having a piston body coupled to the shaft, the piston body slidably received within the damper body, the piston body dividing the chamber into a first chamber and a second chamber, the adjustable piston system defining a flow path between the first chamber to the second chamber across the piston body, the adjustable piston system including:
  - a compression needle tip extending through the piston body, the compression needle tip moveable relative to the piston body; and
  - a check valve coupled to the compression needle tip and moveable with the compression needle tip relative to the piston body, the check valve to enable a flow of fluid through the flow path from the first chamber to the second chamber and prevent the flow of fluid through the flow path from the second chamber to the first chamber,
  - wherein the check valve is disposed in the second chamber.

16. A damper for a bicycle suspension component, the damper comprising:
- a damper body defining a chamber;
- a shaft extending into the chamber of the damper body; and
- an adjustable piston system having a piston body coupled to the shaft, the piston body slidably received within the damper body, the piston body dividing the chamber into a first chamber and a second chamber, the adjustable piston system defining a flow path between the first chamber and the second chamber across the piston body, the adjustable piston system including:
  - a rebound needle coaxially disposed in the shaft;
  - a compression needle coaxially disposed in the rebound needle; and
  - a compression needle tip coupled to an end of the compression needle and extending through the piston body, the compression needle tip having an internal passage that forms a portion of the flow path between the first chamber and the second chamber,
  - wherein the adjustable piston system includes a check valve coupled to the compression needle tip, the check valve to enable a flow of fluid through the flow path from the first chamber to the second chamber and prevent the flow of fluid through the flow path from the second chamber to the first chamber.

17. The damper of claim 16, wherein the adjustable piston system includes a lift plate coupled to the compression needle tip, the lift plate disposed between the check valve and the piston body.

* * * * *